United States Patent
Yang et al.

(10) Patent No.: US 11,553,346 B2
(45) Date of Patent: Jan. 10, 2023

(54) MISBEHAVIOR DETECTION IN AUTONOMOUS DRIVING COMMUNICATIONS

(71) Applicant: Intel Corporation, Santa Clara, CA (US)

(72) Inventors: Liuyang Lily Yang, Portland, OR (US); Manoj R. Sastry, Portland, OR (US); Xiruo Liu, Portland, OR (US); Moreno Ambrosin, Kirkland, WA (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 16/729,250

(22) Filed: Dec. 27, 2019

(65) Prior Publication Data
US 2020/0137580 A1    Apr. 30, 2020

Related U.S. Application Data

(60) Provisional application No. 62/812,509, filed on Mar. 1, 2019.

(51) Int. Cl.
| | |
|---|---|
| *H04W 12/12* | (2021.01) |
| *H04W 12/122* | (2021.01) |
| *H04W 4/40* | (2018.01) |
| *H04W 8/00* | (2009.01) |

(Continued)

(52) U.S. Cl.
CPC ........ *H04W 12/122* (2021.01); *G05D 1/0088* (2013.01); *G08G 1/164* (2013.01);
(Continued)

(58) Field of Classification Search
CPC ....... H04W 1/122; H04W 4/40; H04W 48/02; H04W 4/42; H04W 4/44; H04W 4/46;
(Continued)

(56) References Cited

U.S. PATENT DOCUMENTS 10,086,782 B1 *  10/2018  Konrardy ......... G08G 1/096725
10,556,600 B2 *  2/2020   James .................. G05D 1/0061
(Continued)

OTHER PUBLICATIONS

Intelligent Transport Systems, Security Credential Management System (SCMS), United States Department of Transportation, available online at https://web.archive.org/web/20190109142725/https://www.its.dot.gov/resources/scms.htm, at least as early as Jan. 9, 2019 (3 pages).

(Continued)

*Primary Examiner* — Mewale A Ambaye
(74) *Attorney, Agent, or Firm* — Alliance IP, LLC

(57) ABSTRACT

A first roadway system receives a communication from a second roadway system over a wireless channel, where the communication includes a description of a physical object within a driving environment. Characteristics of the physical object are determined based on sensors of the first roadway system. The communication is determined to contain an anomaly based on a comparison of the description of the physical object with the characteristics determined based on the sensors of the first roadway system. Misbehavior data is generated to describe the anomaly. A remedial action is initiated based on the anomaly.

20 Claims, 19 Drawing Sheets

(51) Int. Cl.
*G08G 1/16* (2006.01)
*G05D 1/00* (2006.01)
*H04W 48/02* (2009.01)

(52) U.S. Cl.
CPC .............. *H04W 4/40* (2018.02); *H04W 8/005* (2013.01); *H04W 48/02* (2013.01); *G05D 2201/0213* (2013.01)

(58) Field of Classification Search
CPC .... H04W 12/08; H04W 12/12; G05D 1/0088; G05D 2201/0213; G08G 1/164; H04L 41/5058; H04L 29/08648
See application file for complete search history.

(56) References Cited

U.S. PATENT DOCUMENTS

| | | | | |
|---|---|---|---|---|
| 2011/0118013 | A1* | 5/2011 | Mattice | G07F 17/3202 463/30 |
| 2015/0212314 | A1* | 7/2015 | Ku | G02B 5/00 359/578 |
| 2016/0239904 | A1* | 8/2016 | Washington | G06Q 50/12 |
| 2019/0039612 | A1 | 2/2019 | Yang et al. | |
| 2019/0130762 | A1 | 5/2019 | Yang et al. | |
| 2019/0206258 | A1* | 7/2019 | Chang | G08G 1/202 |
| 2019/0215965 | A1 | 7/2019 | Majidi et al. | |
| 2020/0017114 | A1* | 1/2020 | Santoni | B60W 50/023 |
| 2020/0023289 | A1* | 1/2020 | Hofmann | B01D 15/265 |
| 2020/0026289 | A1* | 1/2020 | Alvarez | G07C 5/085 |

OTHER PUBLICATIONS

Security Credential Management System Proof-of-Concept Implementation, EE Requirements and Specifications Supporting SCMS Software Release 1.1, Submitted to the U.S. Department of Transportation National Highway Traffic Safety Administration (BHTSA) May 4, 2016 (559 pages).

* cited by examiner

MISBEHAVIOR DETECTION IN AUTONOMOUS DRIVING COMMUNICATIONS

RELATED APPLICATIONS

This application claims benefit to U.S. Provisional Patent Application Ser. No. 62/812,509, filed Mar. 1, 2019 and incorporated by reference herein in its entirety.

TECHNICAL FIELD

This disclosure relates in general to the field of computer systems and, more particularly, to computing systems facilitating communication between autonomous vehicles.

BACKGROUND

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle.

BRIEF DESCRIPTION OF THE DRAWINGS

Like reference numbers and designations in the various drawings indicate like elements.

DESCRIPTION OF EXAMPLE EMBODIMENTS

Figure 1:
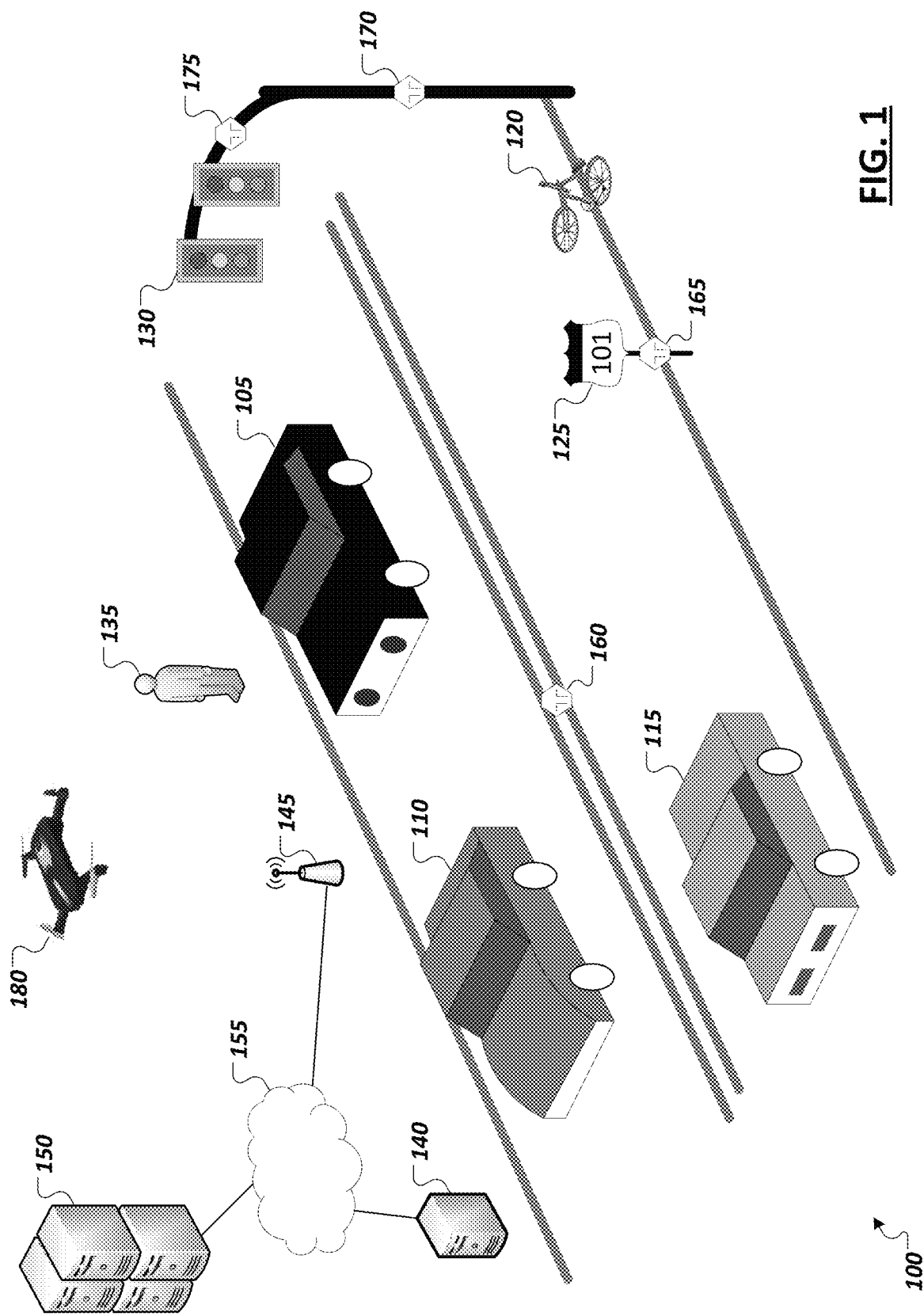
FIG. 1 is a simplified block diagram of an example driving environment.

FIG. 1 is a simplified illustration 100 showing an example autonomous driving environment. Vehicles (e.g., 105, 110, 115, etc.) may be provided with varying levels of autonomous driving capabilities facilitated through in-vehicle computing systems with logic implemented in hardware, firmware, and/or software to enable respective autonomous driving stacks. Such autonomous driving stacks may allow vehicles to self-control or provide driver assistance to detect roadways, navigate from one point to another, detect other vehicles and road actors (e.g., pedestrians (e.g., 135), bicyclists, etc.), detect obstacles and hazards (e.g., 120), and road conditions (e.g., traffic, road conditions, weather conditions, etc.), and adjust control and guidance of the vehicle accordingly.

In some implementations, vehicles (e.g., 105, 110, 115) within the environment may be "connected" in that the in-vehicle computing systems include communication modules to support wireless communication using one or more technologies (e.g., IEEE 802.11 communications (e.g., WiFi), cellular data networks (e.g., 3rd Generation Partnership Project (3GPP) networks, Global System for Mobile Communication (GSM), general packet radio service, code division multiple access (CDMA), etc.), Bluetooth™, millimeter wave (mmWave), ZigBee™, Z-Wave™, etc.), allowing the in-vehicle computing systems to connect to and communicate with other computing systems, such as the in-vehicle computing systems of other vehicles, roadside units, cloud-based computing systems, or other supporting infrastructure. For instance, in some implementations, vehicles (e.g., 105, 110, 115) may communicate with computing systems providing sensors, data, and services in support of the vehicles' own autonomous driving capabilities. For instance, as shown in the illustrative example of FIG. 1, supporting drones 180 (e.g., ground-based and/or aerial), roadside computing devices (or road side units (RSUs) (e.g., 140), various external (to the vehicle, or "extraneous") sensor devices (e.g., 160, 165, 170, 175, etc.), and other devices may be provided as autonomous driving infrastructure separate from the computing systems, sensors, and logic implemented on the vehicles (e.g., 105, 110, 115) to support and improve autonomous driving results provided through the vehicles, among other examples. Vehicles may also communicate with other connected vehicles over wireless communication channels to share data and coordinate movement within an autonomous driving environment, among other example communications.

As illustrated in the example of FIG. 1, autonomous driving infrastructure may incorporate a variety of different systems. Such systems may vary depending on the location, with more developed roadways (e.g., roadways controlled by specific municipalities or toll authorities, roadways in urban areas, sections of roadways known to be problematic for autonomous vehicles, etc.) having a greater number or more advanced supporting infrastructure devices than other sections of roadway, etc. For instance, supplemental sensor devices (e.g., 160, 165, 170, 175) may be provided, which include sensors for observing portions of roadways and vehicles moving within the environment and generating corresponding data describing or embodying the observations of the sensors. As examples, sensor devices may be embedded within the roadway itself (e.g., sensor 160), on roadside or overhead signage (e.g., sensor 165 on sign 125), sensors (e.g., 170, 175) attached to electronic roadside equipment or fixtures (e.g., traffic lights (e.g., 130), electronic road signs, electronic billboards, etc.), dedicated road side units (e.g., 140), among other examples. Sensor devices may also include communication capabilities to communicate their collected sensor data directly to nearby connected vehicles or to fog- or cloud-based computing systems (e.g., 140, 150). Vehicles may obtain sensor data collected by external sensor devices (e.g., 160, 165, 170, 175, 180), or data embodying observations or recommendations generated by other systems (e.g., 140, 150) based on sensor data from these sensor devices (e.g., 160, 165, 170, 175, 180), and use this data in sensor fusion, inference, path planning, and other tasks performed by the in-vehicle autonomous driving system. In some cases, such extraneous sensors and sensor data may, in actuality, be within the vehicle, such as in the form of an after-market sensor attached to the vehicle, a personal computing device (e.g., smartphone, wearable, etc.) carried or worn by passengers of the vehicle, etc. Other road actors, including pedestrians, bicycles, drones, electronic scooters, etc., may also be provided with or carry sensors to generate sensor data describing an autonomous driving environment, which may be used and consumed by autonomous vehicles, cloud- or fog-based support systems (e.g., 140, 150), other sensor devices (e.g., 160, 165, 170, 175, 180), among other examples.

As autonomous vehicle systems may possess varying levels of functionality and sophistication, support infrastructure may be called upon to supplement not only the sensing capabilities of some vehicles, but also the computer and machine learning functionality enabling autonomous driving functionality of some vehicles. For instance, compute resources and autonomous driving logic used to facilitate machine learning model training and use of such machine learning models may be provided on the in-vehicle computing systems entirely or partially on both the in-vehicle systems and some external systems (e.g., 140, 150). For instance, a connected vehicle may communicate with roadside units, edge systems, or cloud-based devices (e.g., 140) local to a particular segment of roadway, with such devices (e.g., 140) capable of providing data (e.g., sensor data aggregated from local sensors (e.g., 160, 165, 170, 175, 180) or data reported from sensors of other vehicles), performing computations (as a service) on data provided by a vehicle to supplement the capabilities native to the vehicle, and/or push information to passing or approaching vehicles (e.g., based on sensor data collected at the device 140 or from nearby sensor devices, etc.). A connected vehicle (e.g., 105, 110, 115) may also or instead communicate with cloud-based computing systems (e.g., 150), which may provide similar memory, sensing, and computational resources to enhance those available at the vehicle. For instance, a cloud-based system (e.g., 150) may collect sensor data from a variety of devices in one or more locations and utilize this data to build and/or train machine-learning models which may be used at the cloud-based system (to provide results to various vehicles (e.g., 105, 110, 115) in communication with the cloud-based system 150, or to push to vehicles for use by their in-vehicle systems, among other example implementations. Access points (e.g., 145), such as cell-phone towers, road-side units, network access points mounted to various roadway infrastructure, access points provided by neighboring vehicles or buildings, and other access points, may be provided within an environment and used to facilitate communication over one or more local or wide area networks (e.g., 155) between cloud-based systems (e.g., 150) and various vehicles (e.g., 105, 110, 115). Through such infrastructure and computing systems, it should be appreciated that the examples, features, and solutions discussed herein may be performed entirely by one or more of such in-vehicle computing systems, fog-based or edge computing devices, or cloud-based computing systems, or by combinations of the foregoing through communication and cooperation between the systems.

In general, "servers," "clients," "computing devices," "network elements," "hosts," "platforms", "sensor devices," "edge device," "autonomous driving systems", "autonomous vehicles", "fog-based system", "cloud-based system", and "systems" generally, etc. discussed herein can include electronic computing devices operable to receive, transmit, process, store, or manage data and information associated with an autonomous driving environment. As used in this document, the term "computer," "processor," "processor device," or "processing device" is intended to encompass any suitable processing apparatus, including central processing units (CPUs), graphical processing units (GPUs), application specific integrated circuits (ASICs), field programmable gate arrays (FPGAs), digital signal processors (DSPs), tensor processors and other matrix arithmetic processors, among other examples. For example, elements shown as single devices within the environment may be implemented using a plurality of computing devices and processors, such as server pools including multiple server computers. Further, any, all, or some of the computing devices may be adapted to execute any operating system, including Linux™, UNIX™, Microsoft™ Windows™, Apple™ macOS™, Apple™ iOS™, Google™ Android™, Windows Server™, etc., as well as virtual machines adapted to virtualize execution of a particular operating system, including customized and proprietary operating systems.

Any of the flows, methods, processes (or portions thereof) or functionality of any of the various components described below or illustrated in the figures may be performed by any suitable computing logic, such as one or more modules, engines, blocks, units, models, systems, or other suitable computing logic. Reference herein to a "module", "engine", "block", "unit", "model", "system" or "logic" may refer to hardware, firmware, software and/or combinations of each to perform one or more functions. As an example, a module, engine, block, unit, model, system, or logic may include one or more hardware components, such as a micro-controller or processor, associated with a non-transitory medium to store code adapted to be executed by the micro-controller or processor. Therefore, reference to a module, engine, block, unit, model, system, or logic, in one embodiment, may refer to hardware, which is specifically configured to recognize and/or execute the code to be held on a non-transitory medium. Furthermore, in another embodiment, use of module, engine, block, unit, model, system, or logic refers to the non-transitory medium including the code, which is specifically adapted to be executed by the microcontroller or processor to perform predetermined operations. And as can be inferred, in yet another embodiment, a module, engine, block, unit, model, system, or logic may refer to the combination of the hardware and the non-transitory medium. In various embodiments, a module, engine, block, unit, model, system, or logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. A module, engine, block, unit, model, system, or logic may include one or more gates or other circuit components, which may be implemented by, e.g., transistors. In some embodiments, a module, engine, block, unit, model, system, or logic may be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Furthermore, logic boundaries that are illustrated as separate commonly vary and potentially overlap. For example, a first and second module (or multiple engines, blocks, units, models, systems, or logics) may share hardware, software, firmware, or a combination thereof, while potentially retaining some independent hardware, software, or firmware.

The flows, methods, and processes described below and in the accompanying figures are merely representative of functions that may be performed in particular embodiments. In other embodiments, additional functions may be performed in the flows, methods, and processes. Various embodiments of the present disclosure contemplate any suitable signaling mechanisms for accomplishing the functions described herein. Some of the functions illustrated herein may be repeated, combined, modified, or deleted within the flows, methods, and processes where appropriate. Additionally, functions may be performed in any suitable order within the flows, methods, and processes without departing from the scope of particular embodiments.

As introduced above, inter-device communication may be utilized to enable multiple vehicles, as well as road side unit (RSU) systems to cooperate and leverage one another's functionality to enhance and facilitate at least semi-autonomous driving environments. For instance, V2X (vehicles-to-everything) communication enables information sharing between vehicles, pedestrians and roadside units in the proximity through V2X messages. As such, V2X becomes may serve as a key enabler for intelligent transportation systems and its usage spans from safety-critical applications to vehicular infotainment systems, from local cooperative driving to large scale traffic management. While such communication schemes may be beneficial to facilitating autonomous driving, such machine-to-machine communications (e.g., V2X) may be vulnerable to attacks or threats. For instance, many V2X applications (e.g., collision avoidance application, intelligent traffic control signal systems) may rely on exchanging driving information (e.g., speed, location, acceleration, and heading) via Basic Safety Messages (BSMs) (e.g., in the United States) or Cooperative Awareness Messages (CAMs) (e.g., in Europe) (referred to herein collectively as basic safety messages (BSMs). Accordingly, security breaches and attacks of such messages may potentially lead to catastrophic safety events and threaten the public trust in such systems.

As one example, autonomous driving systems may support shared perception, with vehicles or road side units equipped with sensors and machine learning-based perception (e.g., computer vision) capabilities that enable machine detection of objects in a driving environment. V2X or other messages may be communicated between roadway systems associated with various roadway actors (e.g., vehicles, road side units, pedestrians/bikers carrying computing devices, etc.), allowing object detection and positioning to be shared between roadway systems to supplement what (if any) perception logic is implemented on the receiving system. A vehicle may then rely on representations by other roadway systems that various objects are present (or not present) based on messages received from other roadway actor systems.

Authenticity and integrity of messages exchanged over V2X is guaranteed by digital signatures. For instance, a computing system of a vehicle or road side unit issuing such messages may sign every message sent using a secret key associated to a given certificate. The receiving system can verify the authenticity and integrity of any message by verifying the validity of the certificate, and of the signature. Such certificates may be managed and issued by a trusted certificate authority. For instance, V2X certificates may be supplied to the legitimate users by a credentials management infrastructure, such as the Secure Credentials Management System (SCMS) in the United States, among other example entities.

While shared perception implementations through V2X has the potential of extending the perception of vehicles with sensors and capable of V2X communication ("Connected Autonomous Vehicles (CAVs)") as well as vehicles without sensors and capable of V2X communication ("Connected Vehicles (CVs)") (vehicles without sensors, but capable of V2X communication). Different from the simple CV case, where vehicles share their pose, speed, and other characteristics of the sending entity in V2X basic safety messages, in a shared perception system, roadway systems may exchange perception information (e.g., the list of objects they detected and tracked). Shared perception may extend the autonomous driving capabilities based on perception to lower level autonomous vehicles. In spite of these example benefits, messages in a V2X system may be vulnerable to malicious actors who may mount fake data attacks to interfere with the correct operation of vehicles on a segment of roadway. While V2X (and other messages) may be integrity and authenticity protected using digital signatures, a sophisticated adversary that possesses valid V2X credentials may nonetheless mount fake data attacks using compromised V2X messages. For instance, an attacker may launch a ghost vehicle attack (GVA) in a shared perception environment, where a malicious sender creates a non-existing or deliberately misplaced object and communicates the same using V2X to influence the perception of the environment of other vehicles. The effects of this attack may be significant for the safety of the vehicles. Accordingly, in this disclosure, improved roadway system implementations are described including features to detect and mitigate against misbehavior involving V2X and other inter-roadway system communications.

Figure 2:
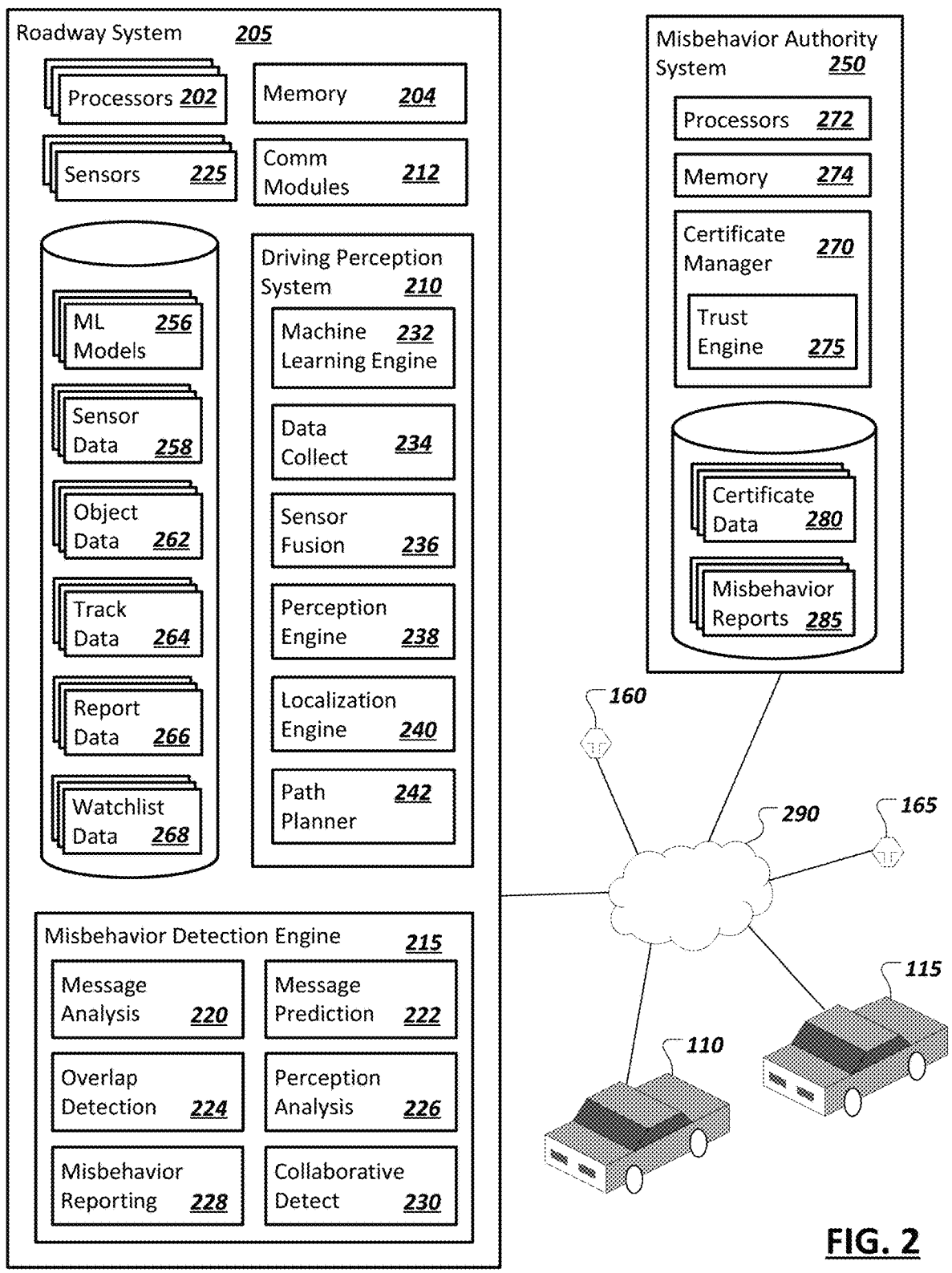
FIG. 2 is a simplified block diagram of an example in-vehicle automated driving system.

With reference now to FIG. 2, a simplified block diagram 200 is shown illustrating an example implementation of a roadway system 205 equipped with a driving perception system 210 and misbehavior detection engine 215. Such a system 205 may be implemented in any one of a variety of roadway actors, such as vehicles (e.g., 110, 115), roadside units (e.g., 160, 165), drones, among other entities at or near a roadway. In one example, a roadways system 205 may include one or more processors 202, such as central processing units (CPUs), graphical processing units (GPUs), application specific integrated circuits (ASICs), field programmable gate arrays (FPGAs), digital signal processors (DSPs), tensor processors and other matrix arithmetic processors, among other examples. Such processors 202 may further include or be coupled to integrated hardware accelerators, which may provide further hardware to accelerate certain processing and memory access functions, such as functions relating to machine learning inference or training (including any of the machine learning inference or training described below), processing of particular sensor data (e.g., camera image data, Light Detecting and Ranging (LIDAR) point clouds, etc.), performing certain arithmetic functions pertaining to autonomous driving (e.g., matrix arithmetic, convolutional arithmetic, etc.), among other examples. One or more memory elements (e.g., 206) may be provided to store machine-executable instructions implementing all or a portion of any one of the modules or sub-modules of an autonomous driving stack implemented on the vehicle, as well as storing data used to perform perception of objects within a driving environment. For instance, such data may include machine learning models (e.g., 256), sensor data (e.g., 258), object data 262 (e.g., determined locally at the roadway system 205 or received from other roadways systems via V2X messaging), and other data received, generated, or used in connection with autonomous driving functionality to be performed by the vehicle (or used in connection with the examples and solutions discussed herein). Various communication modules (e.g., 212) may also be provided, implemented in hardware circuitry and/or software to implement communication capabilities used by the vehicle's system to communicate with other extraneous computing systems over one or more network channels employing one or more network communication technologies (e.g., V2X). These various processors 202, accelerators, memory devices 206, and network communication modules 212, may be interconnected on the vehicle system through a variety of interfaces implemented, for instance, through one or more interconnect fabrics or links, such as fabrics utilizing technologies such as a Peripheral Component Interconnect Express (PCIe), Ethernet, Universal Serial Bus (USB), Ultra Path Interconnect (UPI), Controller Area Network (CAN) bus, among others.

In the case of a vehicle, a roadway system 205 may generate observations and corresponding data that may be utilized as inputs to an in-vehicle driving system to influence the manner in which the driving of the vehicle is controlled. In roadside units, the roadway system 205 may similarly detect and determine behavior of various objects within a portion of a driving environment and communicate these observations to vehicles within the driving environment for their use, as well as to backend systems for further analysis, reporting, security, law enforcement, regulatory and legal compliance, and other example uses. In one implementation, a driving perception system 210 may be provided with machine executable logic (e.g., implemented in hardware and/or software) to "perceive" surrounding objects and events associated with these objects within a driving environment, for instance, using machine learning. Accordingly, a machine learning engine 232 may be provided to utilize various machine learning models (e.g., 256) provided at the roadway system 205 to take as inputs sensor data (e.g., 258) collected by local or extraneous sensors (e.g., 225) and generate inferences based on the trained machine learning models (e.g., 256). Such inferences may form the basis for the perception of a particular object (e.g., to recognize that the object exists and classify the object as a particular type of object (e.g., a car, truck, pedestrian, road sign, bicycle, animal or other road hazard, etc.). Such machine learning models 256 may include artificial neural network models, convolutional neural networks, decision tree-based models, support vector machines (SVMs), Bayesian models, deep learning models, and other example models. In some implementations, an example machine learning engine 232 may further include logic to participate in training (e.g., initial training, continuous training, etc.) of one or more of the machine learning models 256. In some embodiments, the machine learning model training or inference described herein may be performed off-vehicle, among other example implementations.

The machine learning engine(s) 232 provided at the vehicle may be utilized to support and provide results for use by other logical components and modules of the driving perception system 210 implementing an autonomous driving stack and other autonomous-driving-related features. For instance, a data collection module 234 may be provided with logic to determine sources from which data is to be collected (e.g., for inputs in the training or use of various machine learning models 256 used by the vehicle). For instance, the particular source (e.g., internal sensors (e.g., 225) or extraneous sources (communicating over wireless channels)) may be selected, as well as the frequency and fidelity at which the data may be sampled is selected. In some cases, such selections and configurations may be made at least partially autonomously by the data collection module 234 using one or more corresponding machine learning models (e.g., to collect data as appropriate given a particular detected scenario).

A sensor fusion module 236 may also be used to govern the use and processing of the various sensor inputs utilized by the machine learning engine 232 and other modules (e.g., 238, 240, 242, etc.) of the driving perception system 205. One or more sensor fusion modules (e.g., 236) may be provided, which may derive an output from multiple sensor data sources (e.g., on the vehicle or extraneous to the vehicle). The sources may be homogenous or heterogeneous types of sources (e.g., multiple inputs from multiple instances of a common type of sensor, or from instances of multiple different types of sensors). An example sensor fusion module 236 may apply direct fusion, indirect fusion, among other example sensor fusion techniques. The output of the sensor fusion may, in some cases by fed as an input (along with potentially additional inputs) to another module of the driving perception system and/or one or more machine learning models in connection with providing autonomous driving functionality or other functionality, such as described in the example solutions discussed herein.

A perception engine 238 may be provided in some examples, which may take as inputs the results of inferences performed by machine learning engine 232 and/or various sensor data (e.g., 258) including data, in some instances, from extraneous sources and/or sensor fusion module 236 to perform object recognition and/or tracking of detected objects, among other example functions corresponding to autonomous perception of the environment encountered (or to be encountered) by the roadway system 205. Perception engine 238 may perform object recognition from sensor data inputs using deep learning, such as through one or more convolutional neural networks and other machine learning models 256. Object tracking may also be performed to autonomously estimate, from sensor data inputs, whether an object is moving and, if so, along what trajectory. For instance, after a given object is recognized, a perception engine 238 may detect how the given object moves in relation to the vehicle. Such functionality may be used, for instance, to detect objects such as other vehicles, pedestrians, wildlife, cyclists, etc. moving within an environment, which may affect the path of the vehicle on a roadway, among other example uses.

A localization engine 240 may also be included within driving perception system 210 in some implementation. In some cases, localization engine 240 may be implemented as a sub-component of a perception engine 238 and identify coordinates or other location information (e.g., relative distance between objects) for objects detected in the environment. The localization engine 240 may also make use of one or more machine learning models 256 and sensor fusion (e.g., of LIDAR and GPS data, etc.) to determine a high confidence location of the vehicle and the space it occupies within a given physical space (or environment).

A driving perception system (e.g., 210) may further include a path planner 242, which may make use of the results of various other modules, such as data collection 234, sensor fusion 236, perception engine 238, and localization engine (e.g., 240) among others (e.g., recommendation engine 244) to determine a path plan and/or action plan where the driving perception system 210 is implemented on a vehicle, which may be used by actuate controls to automate driving functionality of the vehicle within an environment. In the case of a roadside unit, a path planner 242 may utilize perceptions determined for various moving objects within an environment and predict (e.g., based on other objects detected within the environment or other determined roadway conditions (e.g., weather, light conditions, etc.) how a particular object (e.g., a vehicle, a pedestrian, a bike, etc.) is likely to behave and move within the environment in the immediate future. For instance, a path planner 242 may utilize sensor data, other machine learning models, and inputs provided by other modules of the driving perception system 210 to determine probabilities of various events within a driving environment to determine effective real-time plans or predicted behaviors within the environment.

As discussed above, a roadway system (e.g., 205) may utilize a variety of sensor data (e.g., 258) generated by various sensors provided on and external to the vehicle. As an example, a vehicle may possess an array of sensors (e.g., 225) to collect various information relating to the exterior of the vehicle and the surrounding environment, vehicle system status, conditions within the vehicle, and other information usable by the modules of the vehicle's driving perception system 210. For instance, such sensors 225 may include global positioning (GPS) sensors, light detection and ranging (LIDAR) sensors, two-dimensional (2D) cameras, three-dimensional (3D) or stereo cameras, acoustic sensors, inertial measurement unit (IMU) sensors, thermal sensors, ultrasound sensors, bio sensors (e.g., facial recognition, voice recognition, heart rate sensors, body temperature sensors, emotion detection sensors, etc.), radar sensors, weather sensors (not shown), among other example sensors. Similar sensors may be utilized in roadside units. Indeed, sensor data 258 may be generated by sensors that are not integrally coupled to the vehicle, including sensors on other vehicles (e.g., 115) (which may be communicated through vehicle-to-vehicle communications or other techniques), sensors on ground-based or aerial drones, sensors of user devices (e.g., a smartphone or wearable) carried by human users inside or outside a vehicle, and sensors mounted or provided with other roadside elements, such as another roadside unit (e.g., 160), road sign, traffic light, streetlight, etc. Sensor data from such extraneous sensor devices may be provided directly from the sensor devices to the vehicle or may be provided through data aggregation devices or as results generated based on these sensors by other computing systems, among other example implementations.

In some implementations, an autonomous vehicle or roadside unit may interface with and leverage information and services provided by other computing systems to enhance, enable, or otherwise support the perception functionality of the system. In some instances, some autonomous driving features (including some of the example solutions discussed herein) may be enabled through services, computing logic, machine learning models, data, or other resources of computing systems external to a vehicle. When such external systems are unavailable to a vehicle, it may be that these features are at least temporarily disabled. For instance, external computing systems may be provided and leveraged, which are hosted in road-side units or fog-based edge devices, other (e.g., higher-level) vehicles (e.g., 115), and cloud-based systems (e.g., accessible through various networks (e.g., 290)). A roadside unit or cloud-based system (or other cooperating system, with which a vehicle (e.g., 115) interacts may include all or a portion of the logic typically implemented in an example in-vehicle automated driving system (e.g., including driving perception system 210), along with potentially additional functionality and logic. For instance, a cloud-based computing system, road side unit 140, or other computing system may include a machine learning engine supporting either or both model training and inference engine logic. For instance, such external systems may possess higher-end computing resources and more developed or up-to-date machine learning models, allowing these services to provide superior results to what would be generated natively on a vehicle's automated driving system. For instance, an automated driving system may rely on the machine learning training, machine learning inference, and/or machine learning models provided through a cloud-based service for certain tasks and handling certain scenarios. Indeed, it should be appreciated that one or more of the modules discussed and illustrated as belonging to vehicle may, in some implementations, be alternatively or redundantly provided within a cloud-based, fog-based, or other computing system supporting an autonomous driving environment.

Continuing with the example of FIG. 2, an example roadway system (e.g., 205) may include a misbehavior detection engine 215 to detect instances where messages communicated by other roadway systems (e.g., of a nearby vehicle (e.g., 110, 115) or roadside unit (e.g., 160, 165) may have been compromised and should not be trusted and used by the roadway system 205. An example misbehavior detection engine 215 may include various components to enable various modes of misbehavior detection. For instance, a misbehavior detection engine 215 may include a message analysis engine 220 with logic to scan messages (e.g., V2x) received from other roadway systems to detect inconsistencies with either or both the format or content of the messages suggesting an error or malicious intent in the messages. For instance, message analysis engine 220 may detect instances where the same sender sends the same object twice, perform range checks (e.g., to detect acceleration outside predefined boundaries, sudden appearance/teleporting of an object as reported in basic safety message, etc.). In this sense, a message analysis engine 220 may detect potential misbehavior by another roadway system solely from the content and/or format of the received message. Accordingly, even vehicles without in-vehicle perception systems may include and utilize a message analysis engine to detect potential misbehavior utilizing V2X messaging.

In some implementations, a misbehavior detection engine 215 may additionally include a message prediction engine 222 to determine potential misbehavior by determining that content of a received message includes information that deviates from information expected to be contained in the message (e.g., based on information included in previous messages from the same (or a different) roadway system). For instance, the message prediction engine 222 may maintain and utilize one or more data models modeling behavior of vehicles and other objects that may move within a driving environment. The message prediction engine 222 may additionally store records of previously received messages from various other roadway systems describing objects within an environment. Based on the previously received messages and the model, an example message prediction engine 222 can predict (e.g., within a range) information to be contained in a subsequent message from another or the same roadway system describing position of a particular object. If a subsequent message describes the particular object as having a location or characteristics outside of the predicted range, the message prediction engine 222 may determine that an incident of potential misbehavior has been detected and may continue to monitor messages from the source of the subsequent message (and/or preceding message(s)) for additional anomalies. For instance, a particular roadway system associated with a corresponding certificate or identifier may be tracked in watchlist data (e.g., 268), which identifies the roadway systems from which detected anomalous messages originated.

An example misbehavior detection engine 215 may additionally include an overlap detector 224, which may track the various objects detected and described in received basic safety messages (and other V2X message). More particularly, the overlap detector 224 may track the location of a set of objects as reported in an environment and determine an anomaly in a received basic safety message that identifies an object that reportedly overlaps with another different object in the same physical space (e.g., the message identifies a first automobile occupying a particular space as a truck reported in another message by another roadway system, among other examples). Such overlaps may indicate a malfunction by another roadway system, or more maliciously, an attempted attack, such as a host vehicle attack.

At a roadway system (e.g., 205) each object detected by the system (e.g., using driving perception system 210 and sensors 225) and/or reported as detected by other roadway systems may be tracked using corresponding track data 264. Such track data may be utilized by the overlap detector 224 to track the various objects reported in basic safety messages communicated to the roadway system 205. In some implementations, track data may differentiate or identify the source of the information, for instance, whether it was reported in a message from another roadway system, detected using the local system's perception system 210, or both (where the local driving perception system 210 confirms the validity of basic safety message that describe conditions consistent with what is observed using the local sensors 225). Indeed, a misbehavior detection engine 215 in a roadway system including sensors (e.g., 225) perception logic (e.g., 210) may also include a perception analysis engine 226, which utilizes the perception system 210 of the roadway system to validate objects reported by other roadway systems (e.g., of entities 110, 115, 160, 165, etc.). For instance, a basic safety message from a particular external roadway system may identify the presence or absence of a particular object within a particular space observable using the local perception system 210 of a roadway system 205. The perception analysis engine 226 may detect that the message reports an object that overlaps with another object detected using driving perception system 210 or an object occupying space the driving perception system 210 can confirm is free, and flag the message an anomalous, based on this determination.

As introduced above, as messages are detected with anomalous content, the source of the messages may be flagged as potentially compromised or malicious. A watchlist (embodied in watchlist data 268) may be maintained to track other roadway systems, which the roadway system 205 has detected (e.g., using local misbehavior detection logic (e.g., 220, 222, 224, 226)) as the source of a suspicious message. As not all anomalies may be malicious and anomalies may instead result from outlying errors in the sensors, perception logic, and/or communication channels used by the source roadway system, in some cases, the sending of a single anomalous safety message may not immediately remedial action. However, through watchlist data 268, multiple instances of anomalous data originating from a given source roadway system may result in future messages from this roadway system being untrusted. For instance, watchlist data 268 may include untrusted systems lists, which identify specific roadway systems, which through multiple suspicious messages, have been deemed to be compromised and untrustworthy. Accordingly, a roadway system 205 may ignore information in messages detected as originating from such untrusted sources. Further, an example misbehavior detection engine 215 may include a misbehavior reporting engine (e.g., 228) to report detected misbehavior to other roadway systems (e.g., through V2X messages to neighboring roadway actors (e.g., 110, 115, 160, 165) and/or to backend systems (e.g., 250), such as certificate authorities responsible for maintaining certificates granted to and used by roadway systems to authenticate their reliability.

In some implementations, an example misbehavior detection engine 215 may both send reports of detected anomalous messages to other systems, as well as receive similar anomalous message reports (or "misbehavior reports") from nearby roadway systems (e.g., on 110, 115, 160, 165, etc.) using respective misbehavior detection logic. Instances of misbehavior detected by a collection of roadway systems may be tracked at individual roadway systems (e.g., in watchlist data 268) and external, administrative systems (e.g., misbehavior authority system 250). In some implementations, an example misbehavior detection engine 215 may include a collaborative anomaly detection engine 230, which may facilitate sharing of misbehavior reports between systems. In some implementations, when the number of misbehavior reports reported by nearby systems identifying anomalous behavior by a particular roadway system exceeds a threshold (e.g., a number or rate of anomalous identifications of a particular object, a number or rate of safety messages sent by a particular roadway system that include anomalous information, etc.). Indeed, the collaborative anomaly detection engine 230 may determine, from other roadway systems' messages, that a particular message received from a given roadway system cannot be trusted, even when the particular message is the first that has been received from this system and cannot be verified by the driving perception system 210 of the roadway system 205, among other example features.

While a misbehavior detection engine 215 may determine a local untrusted systems list of roadway systems identifiers (e.g., certificates) that are untrusted (and should be ignored), this may not prevent the same malicious roadway systems from interfering with the operation of other vehicles and roadside units by sharing falsified safety messages (e.g., V2X BSMs). In some implementations, untrusted systems lists may also be shared between roadway systems to help broadcast the presence of a malicious actor. For instance, a roadway system 205 may receive multiple untrusted systems lists shared by multiple other roadway systems and identify repeating roadway system identifiers in the untrusted systems lists. In one example, if a given roadway system identifier is repeated in a number of shared untrusted systems lists, the roadway system 205 may elect to add the roadway system identifier to a local watchlist maintained by the roadway system (even if that roadway system has not been encountered during operation), among other example implementations.

In some implementations, a malicious actor may be more permanently stifled by invoking a misbehavior authority system 250, such as a system associated with a governmental agency, law enforcement, issuer of roadway system certificates, etc. As illustrated in FIG. 2, an example misbehavior authority system 250 may include one or more data processors (e.g., 272), one or more memory elements (e.g., 274), and logic implemented in hardware and/or software to assist in remediating misuse of V2X communication systems and associated certificates. For instance, a certificate manager 270 may be implemented to manage issuance and information for certificates to be used by various roadway systems. Certificate data 280 may be maintained identifying the issuance of specific certificates to specific roadway systems. Certificate data 280 may also include information describing issues and reported misbehavior associated with specific certificates. For instance, roadway systems (e.g., 205) equipped with misbehavior detection logic (e.g., 215) may identify misbehavior involving messages associated with a particular certificate and send misbehavior reports (e.g., 285) to corresponding authorities (e.g., an authority governing misbehavior authority system 250) to report these incidents to the certificate authorities. In some implementations, a certificate manager 270 may include a trust engine 275 to determine compliance (by certificate holders) to various rules and policies associated with the certificate. Such policies may be the basis of algorithms applied by the trust engine 275 to determine whether trust in a particular certificate should be revoked, for instance, based on repeated misbehaviors reported by various roadway systems through corresponding misbehavior reports 285. In some implementations, a trust engine 275 may be utilized to determined that a particular certificate has been compromised by a malicious actor (based on repeated misbehavior reports) and the certificate manager may revoke or cancel the certificate based on the determined malfeasance. When revoked, the roadway system that holds the certificate may be unable to engage in trusted communications with other roadway systems (without having a valid certificate), thereby causing a compromised roadway system to be isolated and universally ignored (e.g., until trust can be reestablished and a new certificate issued), among other examples.

Figure 3:
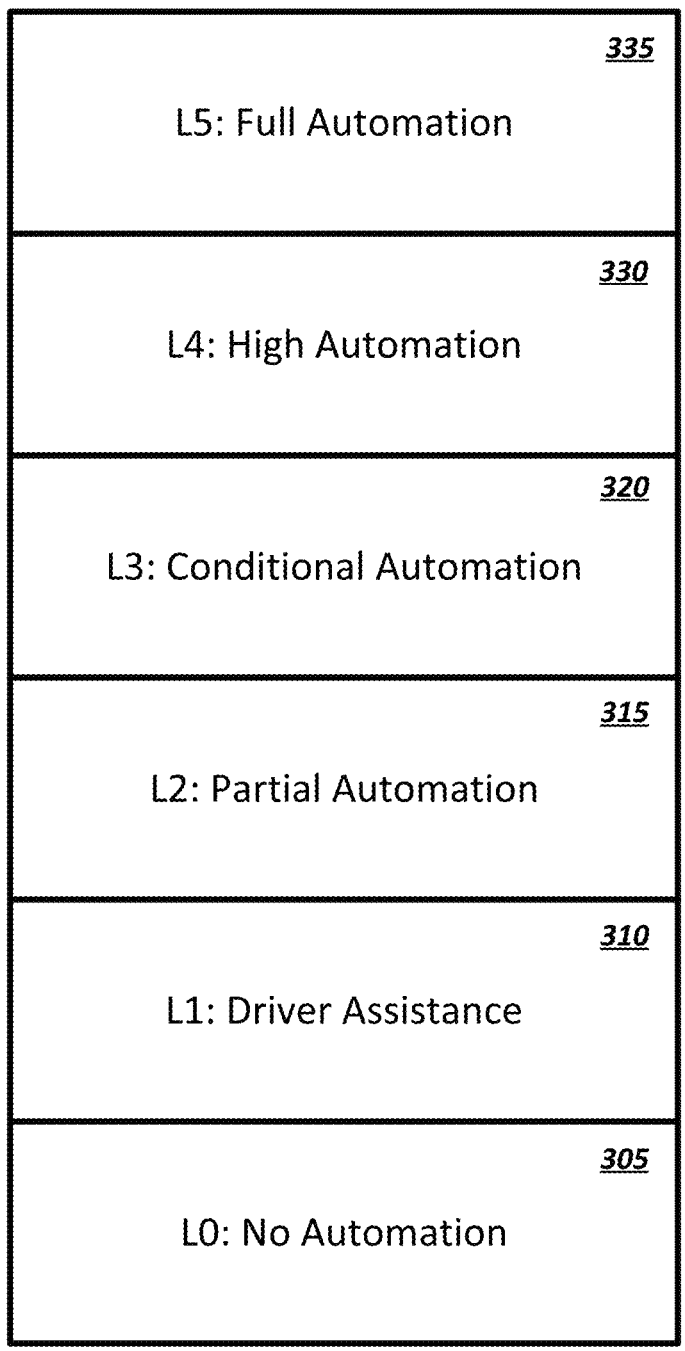
FIG. 3 is a simplified block diagram illustrating automated driving levels.

Turning to FIG. 3, a simplified block diagram 300 is shown illustrating example levels of autonomous driving, which may be supported in various vehicles (e.g., by their corresponding in-vehicle computing systems). For instance, a range of levels may be defined (e.g., L0-L5 (405-435)), with level 5 (L5) corresponding to vehicles with the highest level of autonomous driving functionality (e.g., full automation), and level 0 (L0) corresponding to the lowest level of autonomous driving functionality (e.g., no automation). For instance, an L5 vehicle (e.g., 335) may possess a fully-autonomous computing system capable of providing autonomous driving performance in every driving scenario equal to or better than would be provided by a human driver, including in extreme road conditions and weather. An L4 vehicle (e.g., 330) may also be considered fully-autonomous and capable of autonomously performing safety-critical driving functions and effectively monitoring roadway conditions throughout an entire trip from a starting location to a destination. L4 vehicles may differ from L5 vehicles, in that an L4's autonomous capabilities are defined within the limits of the vehicle's "operational design domain," which may not include all driving scenarios. L3 vehicles (e.g., 320) provide autonomous driving functionality to completely shift safety-critical functions to the vehicle in a set of specific traffic and environment conditions, but which still expect the engagement and availability of human drivers to handle driving in all other scenarios. Accordingly, L3 vehicles may provide handover protocols to orchestrate the transfer of control from a human driver to the autonomous driving stack and back. L2 vehicles (e.g., 315) provide driver assistance functionality, which allow the driver to occasionally disengage from physically operating the vehicle, such that both the hands and feet of the driver may disengage periodically from the physical controls of the vehicle. L1 vehicles (e.g., 310) provide driver assistance of one or more specific functions (e.g., steering, braking, etc.), but still require constant driver control of most functions of the vehicle. L0 vehicles may be considered not autonomous—the human driver controls all of the driving functionality of the vehicle (although such vehicles may nonetheless participate passively within autonomous driving environments, such as by providing sensor data to higher level vehicles, using sensor data to enhance GPS and infotainment services within the vehicle, etc.). In some implementations, a single vehicle may support operation at multiple autonomous driving levels. For instance, a driver may control and select which supported level of autonomy is used during a given trip (e.g., L4 or a lower level). In other cases, a vehicle may autonomously toggle between levels, for instance, based on conditions affecting the roadway or the vehicle's autonomous driving system. For example, in response to detecting that one or more sensors have been compromised, an L5 or L4 vehicle may shift to a lower mode (e.g., L2 or lower) to involve a human passenger in light of the sensor issue, among other examples.

Figure 4:
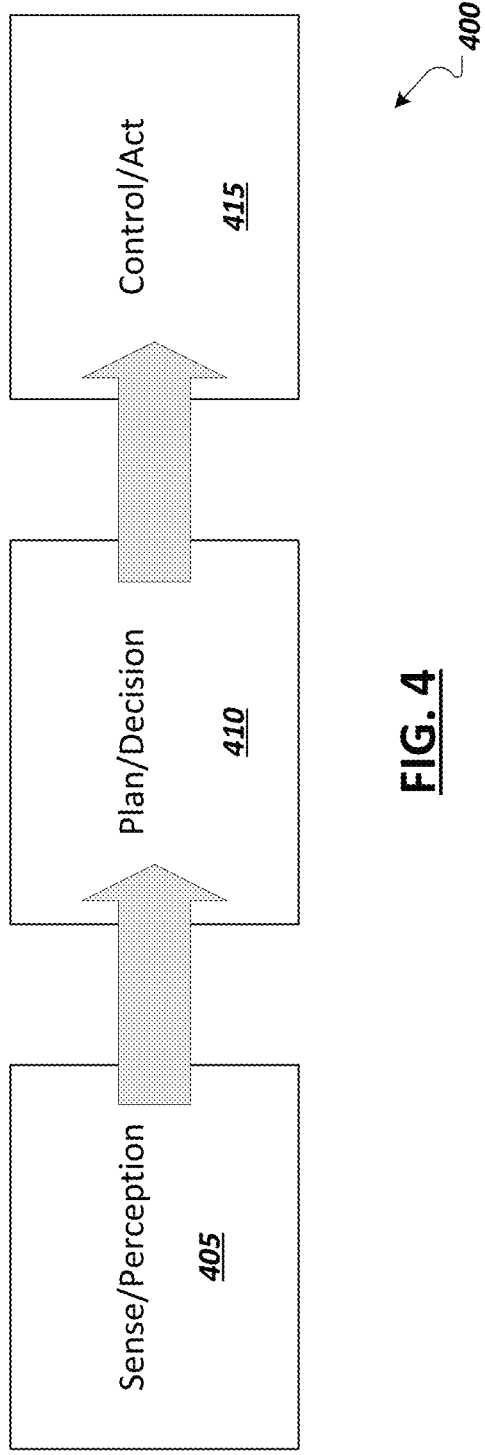
FIG. 4 is a simplified block diagram illustrating operating principles of an automated driving system.
Figure 5:
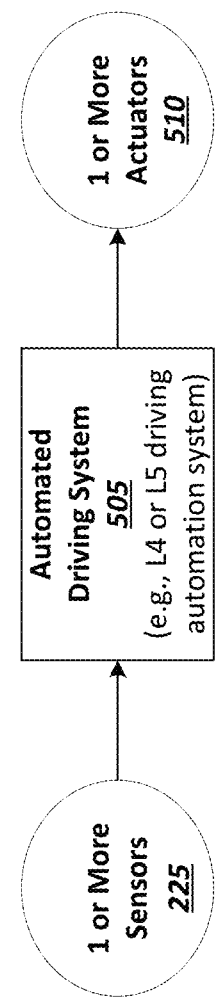
FIG. 5 is a simplified block diagram illustrating basic functions of automated driving systems.

FIG. 4 is a simplified block diagram 400 illustrating an example autonomous driving flow which may be implemented in some autonomous driving systems. For instance, an autonomous driving flow implemented in an autonomous (or semi-autonomous) vehicle may include a sensing and perception stage 405, a planning and decision stage 410, and a control and action phase 415. During a sensing and perception stage 405 data is generated by various sensors and collected for use by the autonomous driving system. Data collection, in some instances, may include data filtering and receiving sensor from external sources. This stage may also include sensor fusion operations and object recognition and other perception tasks, such as localization, performed using one or more machine learning models. A planning and decision stage 410 may utilize the sensor data and results of various perception operations to make probabilistic predictions of the roadway(s) ahead and determine a real time path plan based on these predictions. A planning and decision stage 410 may additionally include making decisions relating to the path plan in reaction to the detection of obstacles and other events to decide on whether and what action to take to safely navigate the determined path in light of these events. Based on the path plan and decisions of the planning and decision stage 410, a control and action stage 415 may convert these determinations into actions, through actuators to manipulate driving controls including steering, acceleration, and braking, as well as secondary controls, such as turn signals, sensor cleaners, windshield wipers, headlights, etc. Accordingly, as illustrated in FIG. 5, the general function of an automated driving system 505 may utilize the inputs of a one or more sensors devices 225 (e.g., multiple sensors of multiple different types) and process these inputs to make a determination for the automated driving of a vehicle. To realize the performance of the automated driving (e.g., acceleration, steering, braking, signaling, etc.), the automated driving system 505 may generate one or more output signals to implement the determining automated driving actions and send these signals to one or more driving controls, or more generally "actuators" 510, utilized to cause the corresponding vehicle to perform these driving actions.

Figure 6:
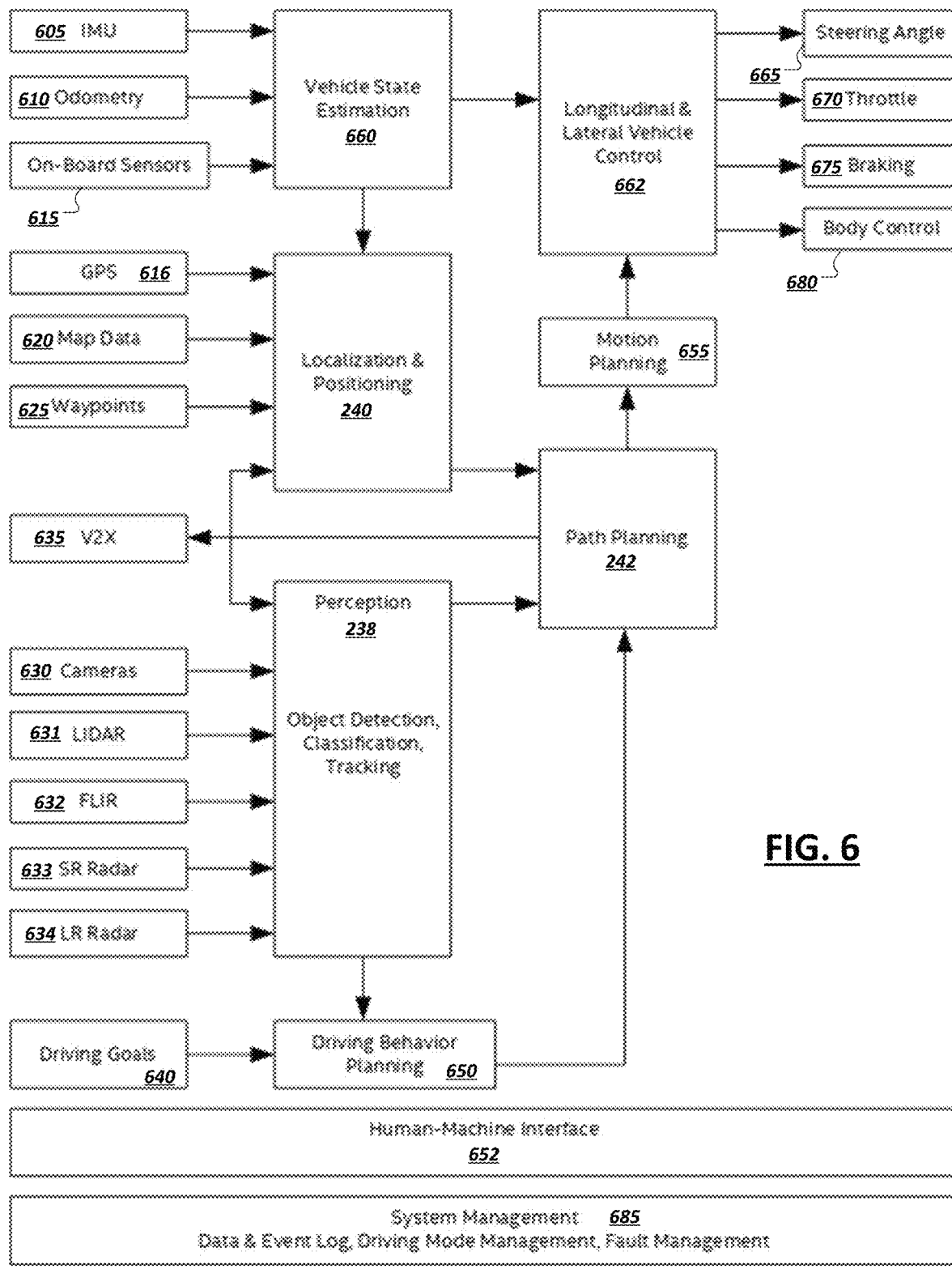
FIG. 6 is a simplified block diagram illustrating components of an example automated driving system.

FIG. 6 is a simplified block diagram illustrating the example interaction of components and logic used to implement an in-vehicle automated driving system in accordance with one example implementation. For instance, a variety of sensors and logic may be provided which may generate data that may be used by the automated driving system, such as inertial measurement units (IMUS) 605, odometry logic 610, on-board sensors 615, GPS sensors 616, map data 620, waypoint data and logic (e.g., 625), cameras (e.g., 630), LIDAR sensors 631, short range radar sensors 633, long range radar sensors 634, forward-looking infrared (FLIR) sensor 632, among other example sensors. Additional information may be provided from sources external to the vehicle (e.g., through a network facilitating vehicle-to-everything (V2X) communications (e.g., 635)) or from the user of the vehicle (e.g., driving goals (e.g., 640) or other inputs provided by passengers within the vehicle (e.g., through human-machine interfaces (e.g., 652)). Some of these inputs may be provided to a perception engine 238, which may assess the information included in sensor data generated by one or a combination of the vehicle's sensors (or even external (e.g., roadside) sensors) and perform object detection (e.g., to identify potential hazards and road characteristics), classify the objects (e.g., to determine whether they are hazards or not), and track objects (e.g., to determine and predict movement of the objects and ascertain whether or when the objects should impact the driving of the vehicle).

Other sensors and logic (e.g., 616, 620, 625, etc.) may be fed to localization and positioning logic (e.g., 240) of the automated driving system to enable accurate and precise localization of the vehicle by the automated driving system (e.g., to understand the geolocation of the vehicle, as well as its position relative to certain actual or anticipated hazards, etc.). Results of the perception engine 230 and localization engine 240 may be utilized together by path planning logic 242 of the automated driving system, such that the vehicle self-navigates toward a desired outcome, while more immediately doing so in a safe manner. Driving behavior planning logic (e.g., 650) may also be provided in some implementations to consider driving goals (e.g., system-level or user-customized goals) to deliver certain driving or user comfort expectations (e.g., speed, comfort, traffic avoidance, toll road avoidance, prioritization of scenic routes or routes that keep the vehicle within proximity of certain landmarks or amenities, etc.). The output of the driving behavior planning module 650 may also be fed into and be considered by a path planning engine 242 in determining the most desirable path for the vehicle.

A path planning engine 242 may decide on the path to be taken by a vehicle, with a motion planning engine 655 tasked with determining "how" to realize this path (e.g., through the driving control logic (e.g., 662) of the vehicle. The driving control logic 662 may also consider the present state of the vehicle as determined using a vehicle state estimation engine 660. The vehicle state estimation engine 660 may determine the present state of the vehicle (e.g., in which direction(s) it is currently moving, the speed is traveling, whether it is accelerating or decelerating (e.g., braking), etc.), which may be considered in determining what driving functions of the vehicle to actuate and how to do so (e.g., using driving control logic 662). For instance, some of the sensors (e.g., 605, 610, 615, etc.) may be provided as inputs to the vehicle state estimation engine 660 and state information may be generated and provided to the driving control logic 662, which may be considered, together with motion planning data (e.g., from motion planning engine 655) to direct the various actuators of the vehicle to implement the desired path of travel accurately, safely, and comfortably (e.g., by engaging steering controls (e.g., 665), throttle (e.g., 670), braking (e.g., 675), vehicle body controls (e.g., 680), etc.), among other examples.

To assess the performance of the automated driving system and its collective components, in some implementations, one or more system management tools (e.g., 685) may also be provided. For instance, system management tools 685 may include logic to detect and log events and various data collected and/or generated by the automated driving system, for instance, to detect trends, enhance or train machine learning models used by the automated driving system, and identify and remedy potential safety issues or errors, among other examples. Indeed, in some implementations, system management tools 685 may include safety sub-systems or companion tools, and may further include fault detection and remediation tools, among other example tools and related functionality. In some implementations, system management tools 685 may additional include misbehavior detection logic, such as discussed herein. In some cases, logic utilized to implement the automated driving system (e.g., perception engine 238, localization engine 240, vehicle state estimation engine 660, sensor fusion logic, machine learning inference engines and machine learning models, etc.) may be utilized to support or at least partially implement system management tools of the vehicle, among other example uses.

Figure 7:
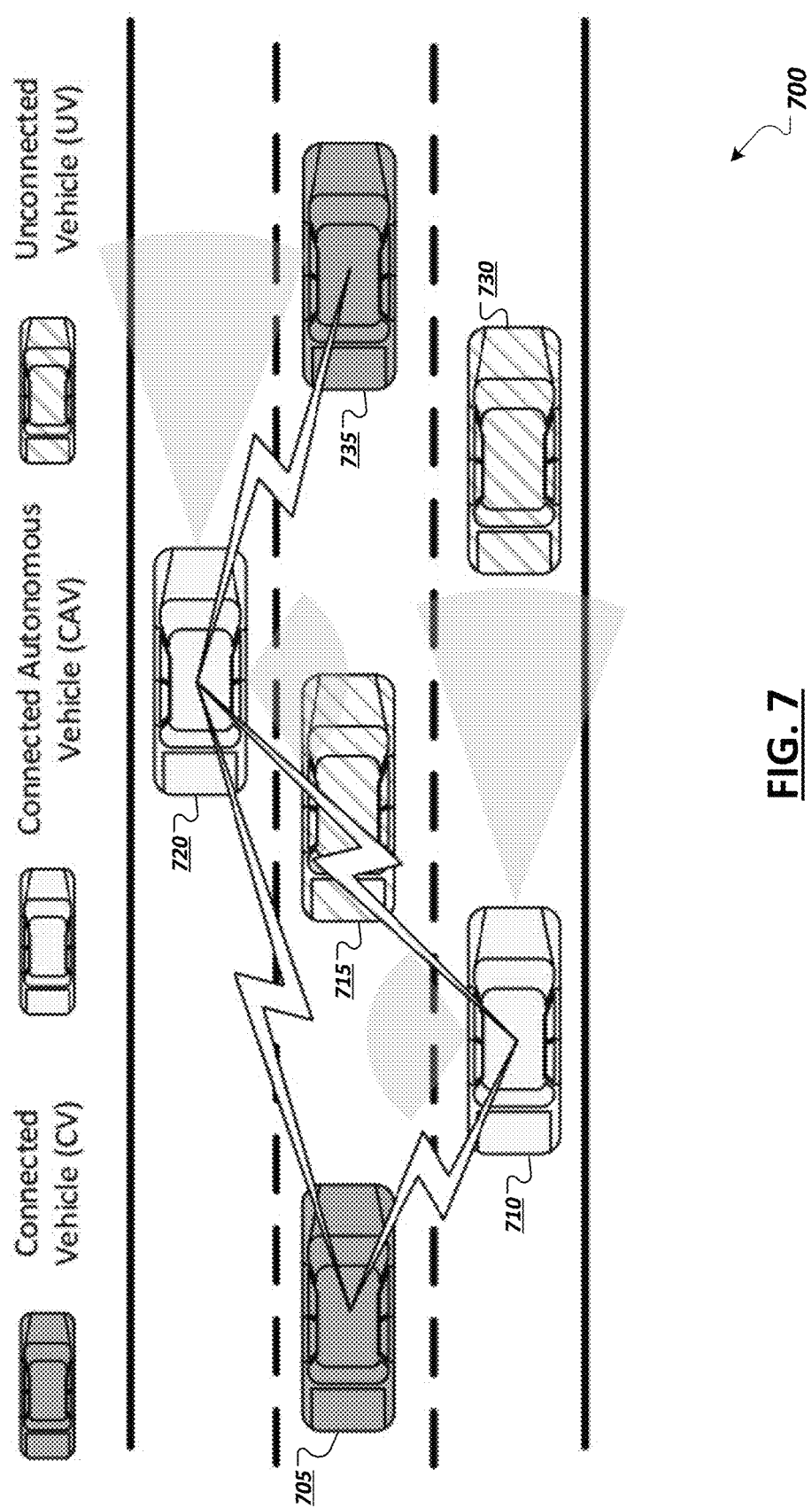
FIG. 7 is a simplified diagram illustrating vehicles within an example driving environment.

Turning to FIG. 7, a simplified diagram 700 is shown illustrating various types of vehicles (e.g., 705, 710, 715, 720, 730, 735, etc.) within a roadway environment. Vehicle-to-vehicle communication may be enabled in a subset of these vehicles. For vehicles with V2X communication capabilities, it may be beneficial to also implement misbehavior detection logic as a safeguard against vulnerabilities introduced through V2X (and V2V) communications. For instance, vehicle types may include connected vehicles (CVs) (e.g., 705, 735) capable of V2V communication, which can receive and act on data received from nearby vehicle (e.g., acting by showing a warning to the driver; share their pose, speed, etc. with neighboring vehicles, etc.). Connected autonomous vehicles (CAVs) (e.g., 710, 720) are another type of vehicle that includes perception capabilities given by some sensors (e.g., LiDAR). CAVs can share the result of their perception to any other CV or CAV, that is, such vehicles can not only share their pose, speed, etc., but also information on the environment as they perceive it. Unconnected vehicles (UVs) (e.g., 715, 725) are vehicles incapable of V2V communication. UVs are not active participants of the shared perception system, but their very existence is critical to the safety of the road. For instance, CAVs can perceive the existence and characteristics of UVs within the environment and inform other CAVs and CVs via V2V communication as part of the implementation of shared perception between the vehicles in the environment.

Messaging between vehicles (e.g., 740, 745, 750, 755) may take a variety of forms and utilize any one of various protocols and technologies, which may be developed, standardized, and deployed for use in driving environments. For instance, messages may be sent between vehicles (as well as between vehicles and roadside units) according to a regular frequency or based on particular events. In one example, communications generated by a roadway system may be periodic and broadcast (e.g., CV and CAV send a message every 100 ms). For instance, a roadway system may send messages at fixed time intervals to every other connected roadway system (e.g., CVs, CAVs, RSUs) within range of the communication. In this manner, roadway systems may share information (e.g., safety messages, misbehavior messages, etc.) with each of its one-hop neighbors. For instance, Basic Safety Messages or Cooperative Awareness Messages (referred to collectively herein as "safety messages") may be broadcasted periodically by each vehicle, typically with a frequency between 10 Hz and 3 Hz. Safety messages may be consumed and fused by the intelligent perception/tracking module of the autonomous driving pipeline (e.g., the ADAS pipeline). Further, through V2X communications, a shared perception system may be embodied, for instance, where both connected roadway systems share lists of objects, that is, observations on themselves and on observed obstacles (where the roadway system is capable).

Figure 8:
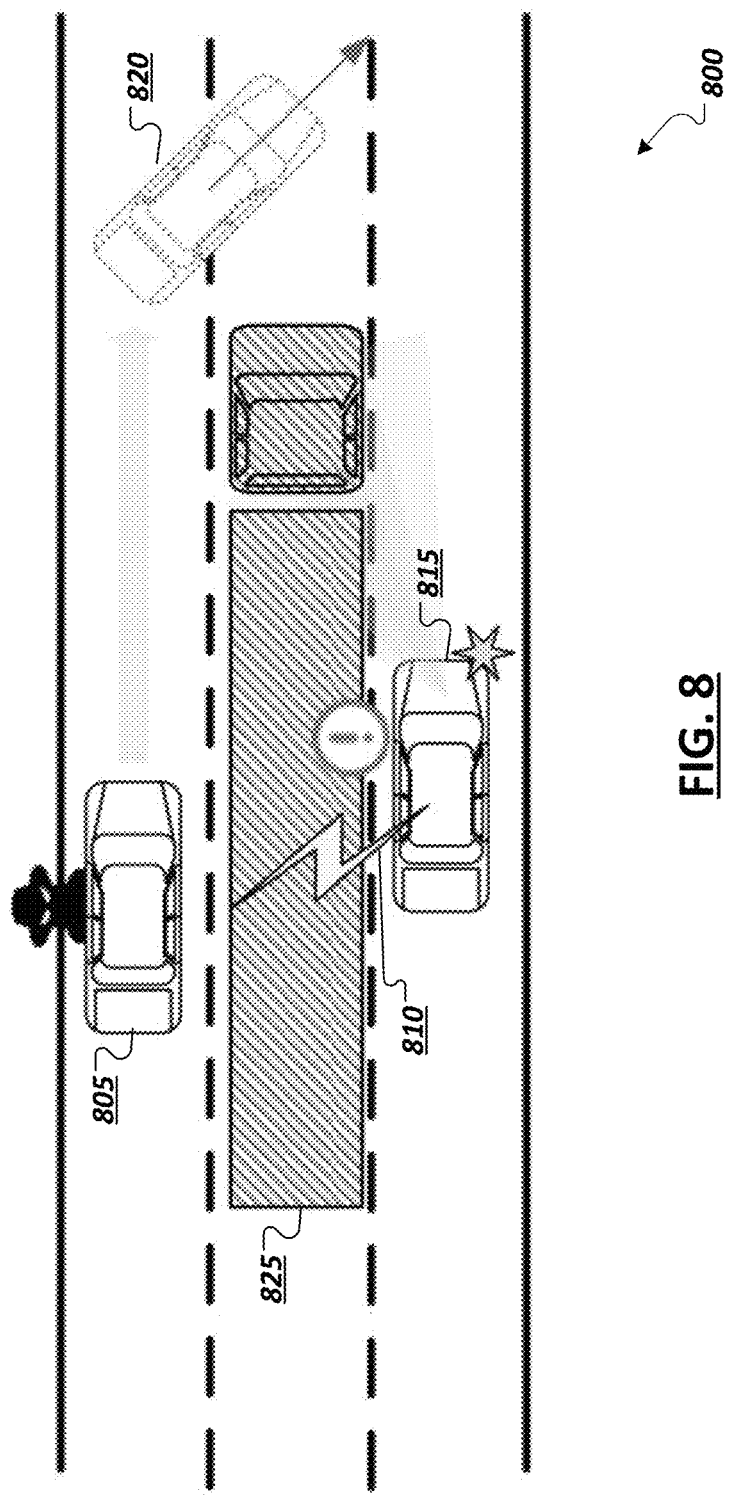
FIG. 8 is a simplified diagram illustrating an example of communication-based misbehavior within an autonomous driving environment.

Turning to FIG. 8, a simplified diagram 800 is shown illustrating an example of a malicious act, which may leverage V2X communications to incorrectly influence the control of a victim vehicle. For instance, an adversary may compromise a vehicle's roadway system (e.g., on-board unit (OBU)) or steal credentials from a legitimate vehicle to craft and distribute V2X messages containing fake information. As a consequence, these messages may be accepted by receiving roadway systems as passing the cryptographic verifications at the victim vehicle or infrastructure node (e.g., RSU), and the fake information may be used in potentially safety-critical applications. This type of attack has the potential to cause serious consequences, such as where a compromised roadway system (e.g., an OBU infected by a malware) alters values of outgoing V2X messages. For instance, as shown in the example of FIG. 8, a compromised vehicle 805 utilizes V2V (or V2X) messaging (e.g., 810) to attempt to induce errors by victim connected vehicles (e.g., 815). For instance, the compromised vehicle's roadway system may broadcast fake information to nearby vehicles, which in this case, may adversely affect a vehicle (e.g., 815) with compromised line of sight (e.g., due to the presence of another vehicle, such as semitruck 825). For instance, such fake information (e.g., a falsified safety message) may include a description of the false position, orientation, and speed, leading a receiving vehicle's 815 roadway system to incorrectly assume the compromised vehicle is behaving in a way it is not (as represented by 820). This may cause the victim vehicle 815 to trigger safety-critical reactions (e.g., in response a dangerous cut-through maneuver 820, as illustrated in the example of FIG. 8).

As introduced above, an improved misbehavior detection system may be provided and enable collaborative misbehavior detection and reporting to identify and remediate instances where malicious actors compromise V2X safety messaging. In some implementations, equipped roadway system may act to detect misbehaving actors and report instances of misbehavior, which may trigger the revocation of such misbehaving actors in connected vehicle systems. In some implementations, one or more of the roadway systems (e.g., vehicles or RSUs) may utilize local onboard sensing capabilities to detect an inconsistency in V2X information reported by a given vehicle with regard to the measured properties of the supposed matching vehicle (e.g., using line of sight sensing through camera, radar, and/or LiDAR sensors, or other verification tools). The inconsistency, or anomaly, may then be reported to other nearby vehicles and/or to a backend misbehavior authority system in the infrastructure, such as the one provided by the Security Credential Management System (SCMS) or other entities, using a Misbehavior Report (MBR) message generated by the detecting roadway system. Such messages may contain the data reported in the anomalous message, as well as the sensed properties of the vehicle by the reporting vehicle as evidence of inconsistency. A misbehavior authority system may collect such misbehavior reporting and fuse related reports to make a decision on the revocation of the vehicle.

Figure 9:
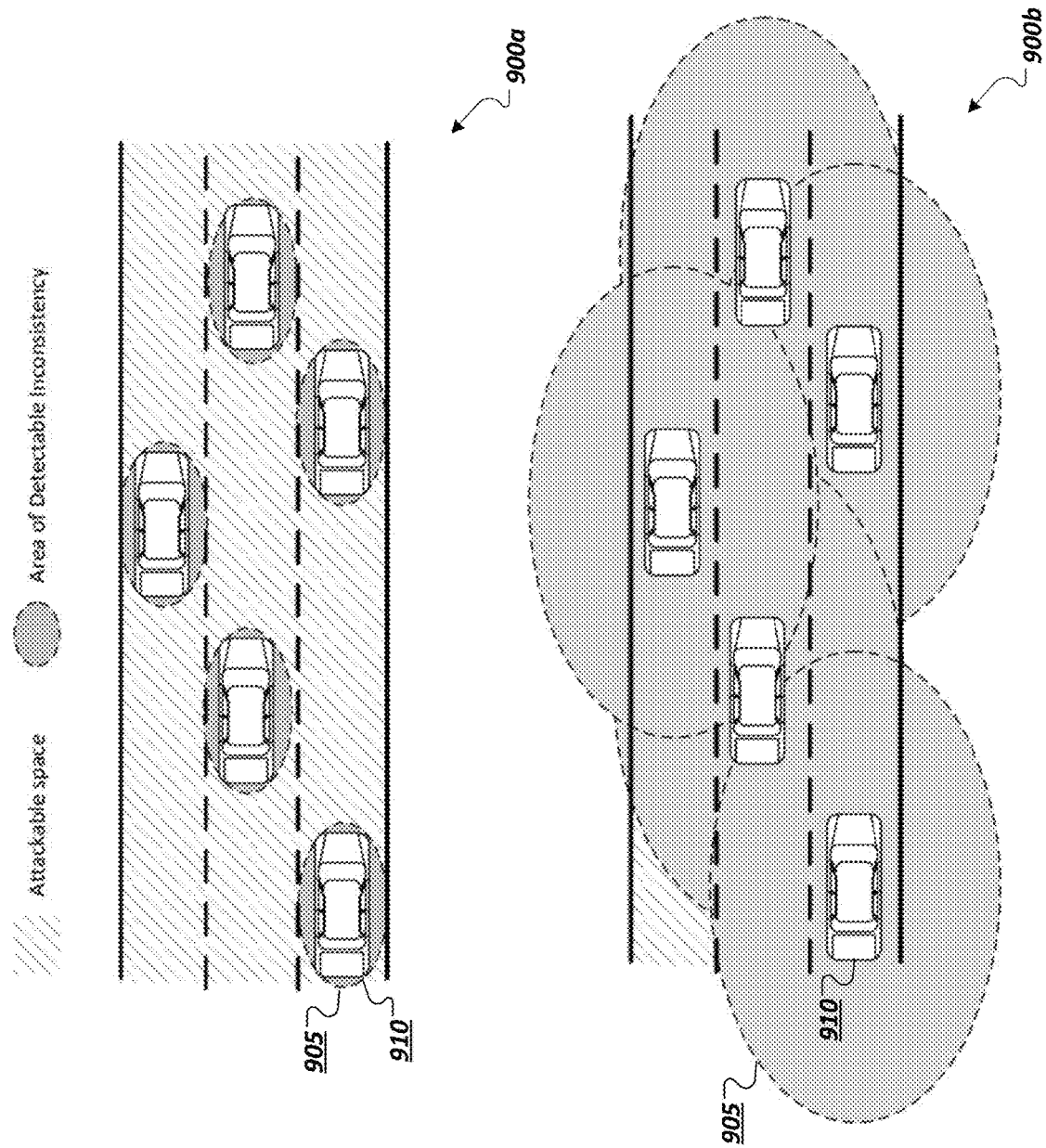
FIG. 9 illustrates diagrams showing the relative attackable areas facilitated in different example autonomous driving systems.

In traditional systems, as illustrated in diagram 900a of FIG. 9, extensive attackable space is made available for exploitation by potential malicious actors (e.g., to introduce a ghost car through false V2X safety messages in a Sybil Attack. Traditional systems may focus entirely on whether the V2X message includes inconsistencies, which may leave vehicles more vulnerable to such attacks. An improved on-board safety system, such as described herein, implementing a misbehavior detection engine to detect wrongful V2X safety messages, may reduce the area available to attacker to potentially inject a ghost vehicle, through the use of perception systems available in at least some of the vehicles, as shown in diagram 900b. Indeed, the absence of a ghost car may be detected by any one of the connected vehicles (or RSUs) possessing perception logic as soon as the alleged vehicle enters the sensing range (e.g., 905) of one of the vehicles (e.g., 910), allowing the inconsistency between reality and information within the suspect message to be detected and reported.

As introduced above, in some implementations, misbehavior detection systems may utilize object tracking (e.g., embodied in track data) to identify inconsistencies in received V2X safety messages. In one example, V2X safety messages may be periodically broadcasted (e.g., with periodicity, for instance, of 10 Hz), and contain at least the sender vehicle's position, heading, speed, and size (e.g., width and length). A message $z_1$ may represent a V2X message carrying information on vehicle i (e.g., 1005), as represented in the simplified diagrams 1000a-c illustrating the example of FIG. 10). In this example, the perspective of a vehicle j (e.g., 1010) observing vehicle i 1005 is discussed for the sake of illustration. It should be appreciated that similar examples exist, for instance, with vehicle i observing vehicle j, a roadside unit observing either (or both) of vehicles i and j, among other vehicles and examples. For example, an RSU may aggregate camera or LIDAR feeds from multiple surveillance cameras or LIDARs to obtain a birds-eyes view of the area, and thereby conduct object tracking and inconsistency detection using its roadway system, such as described in the examples herein. Indeed, an example RSU may have the ability to aggregate many more sensors (e.g., cameras or LIDARs) along a section of a road, or an intersection, with more degree of freedom in terms of placement positions and hence potentially better range and field of view) that is difficult to do for an individual vehicle.

An infrastructure unit, such as an RSU, may also have more powerful computational resources than an individual vehicle, among other example features. Indeed, vehicles and RSUs (or other infrastructure units) may cooperate together to conduct misbehavior detection simultaneously and enhance the quality of the results and achieve better redundancy and system robustness.

Figure 10:
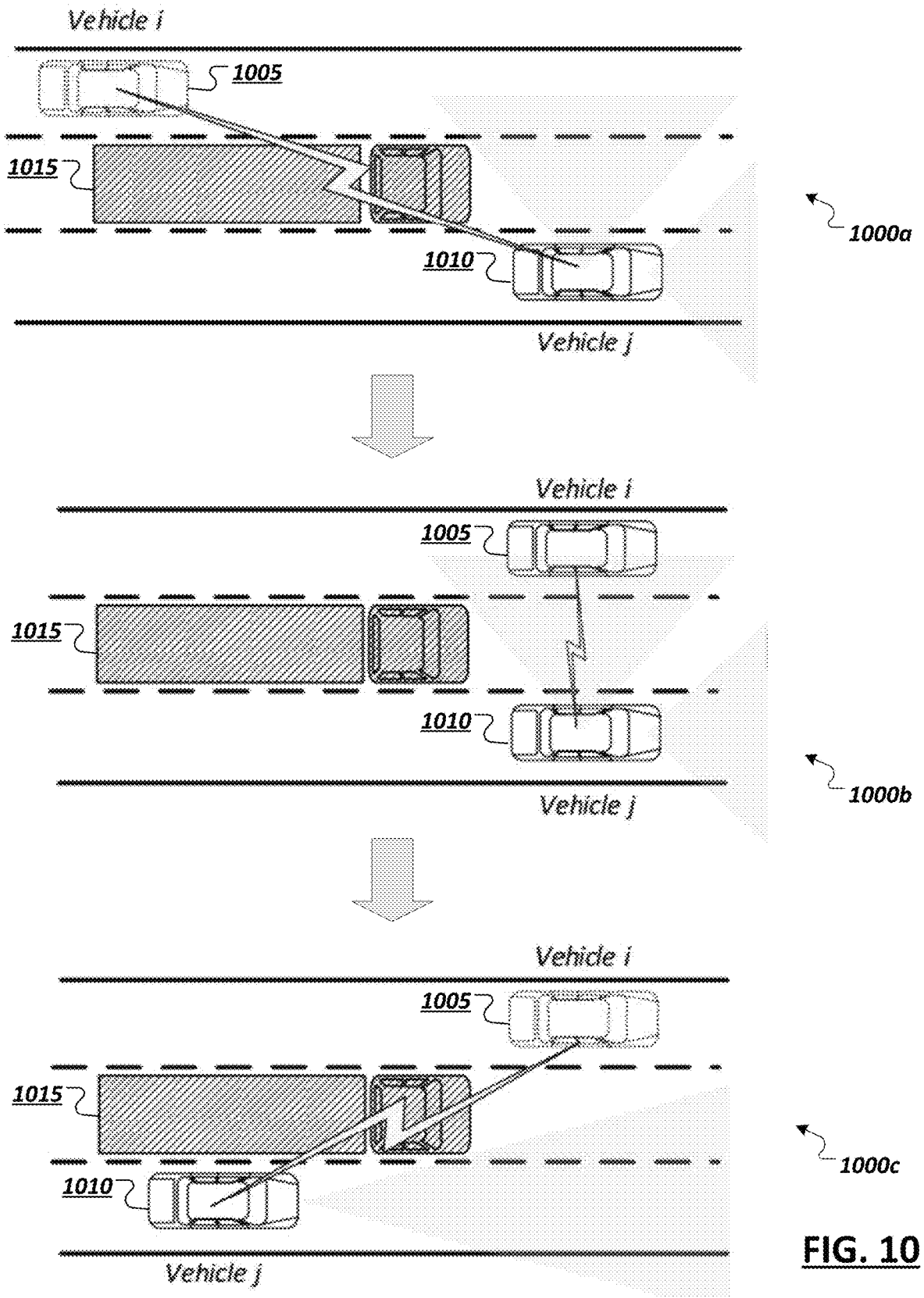
FIG. 10 illustrates diagrams showing an example of the changing states of vehicles in communication with one another over time.

Within the context of the illustrative example of FIG. 10, a first vehicle (e.g., vehicle i 1005) is in the "line-of-sight" of another, second vehicle (e.g., vehicle j 1010), if the second vehicle can sense (and thus track) the first vehicle using its own local sensors. On the other hand, a first vehicle is "V2X-only" with respect to the second vehicle, if the second vehicle does not have a line of sight with the first vehicle, but can receive V2X messages from the first vehicle (or another vehicle sending messages reporting the presence of the first vehicle). In other words, a vehicle is V2X only with respect to another if the only source of information on that vehicle is through a V2X message (e.g., safety message) describing attributes of the vehicle. The corollary is that if a first vehicle is in the line-of-sight of a second vehicle, the first vehicle is not V2X only with respect to the second vehicle.

In traditional systems, onboard sensors may realize a field of view, or reliable line-of-sight, that has a shorter range that V2X communications. Indeed, in practice, full or partial occlusions of on-board sensor materialize due to buildings, larger trucks, and curvy roads commonly found in the real world. Accordingly, the field of view and range of sensors tend to be a subset of the V2X communication range. Further, over time a vehicle i 1005 may transition from V2X-only vehicle to a vehicle in line-of-sight and back again to V2X-only vehicle with regard to another vehicle j 1010 as it drives toward and then passes vehicle j, as illustrated in FIG. 10. For instance, at a time t=n, represented in diagram 1000$a$, vehicle i 1005 may be outside the line-of-sight of vehicle j 1010 by virtue of the presence and position of truck 1015. At time t=n+1, represented in diagram 1000$b$, vehicle i 1005 may have accelerated and passed the truck 1015, bringing vehicle i 1005 into the line of sight of the sensors of vehicle j 1010. The positions of the vehicles 1005, 1010, 1015 may change dynamically as each vehicle drives within the environment, which may result in vehicle i 1005 falling outside the line-of-sight of vehicle j 1010 again, as illustrated in diagram 1000$c$, and so on.

In some implementations, vehicles may be capable of performing Detection and Tracking of Moving Objects (DATMO) to track nearby vehicles that they have in their LOS, and to estimate their position, speed, heading and size. V2X messages (e.g., safety messages) may serves as an additional source of information to use to track other vehicles over time. Indeed, information obtained through V2X for a particular object (e.g., another vehicle) may be fused with the information obtained by direct perception (e.g., using camera, LiDAR, or other systems together with on-board perception logic). Information gleaned for an object from V2X messages and/or perception may be recorded in object tracks maintained in track data of a corresponding roadway system. The tracks may describe a list of objects identified by the roadway system over time through perception or V2X reporting. In one example, object tracks may be implemented as three types of tracks: V2X-only Tracks (VT) that maintain V2X-only object data (e.g., BSMs) when the message describes an object outside the line-of-sight of the system; LOS-only Track (LT) data that tracks information generated for an object using the roadway system's sensors and perception logic (but for which no V2X messages have been received for the object (or where the roadway system does not support such messaging); and Mixed Track (MT) data for objects for which both information is obtained from a combination of both V2X messages and vehicle sensors. In other instances, tracks may be maintained for each object encountered by a roadway system (e.g., within a time window) and the corresponding track data may identify and differentiate between information collected through sensors/perception and information collected from received V2X message, among other example implementations.

Object tracks may be utilized by a misbehavior detection system to detect inconsistencies in subsequent V2X messages including information describing the tracked object. For instance, a ghost vehicle may be detected utilizing track data. For instance, vehicle i may be a Ghost Vehicle (GV) for a vehicle j, $GV_j$ (i,t), if vehicle j detects an inconsistency between vehicle j's knowledge of vehicle i and vehicle j's surroundings. In one example, information reported within an example V2X safety message may place the location of the sending vehicle within an area detected as free by the receiving vehicle's sensors (and recorded in corresponding track data). As a result, the roadway system of the receiving vehicle may determine an anomaly or inconsistency within the content of the received message. The inconsistency (and roadway system responsible for the inconsistency) may then be tracked (e.g., using a watchlist) to determine repeat instances of the same (or different) inconsistencies in messages sent by the sender. Remedial actions may be taken, including messaging a misbehavior authority system, which may potentially revoke the communication privileges of the source system based on misbehavior report messages reporting the inconsistencies, among other example implementations.

Figure 11:
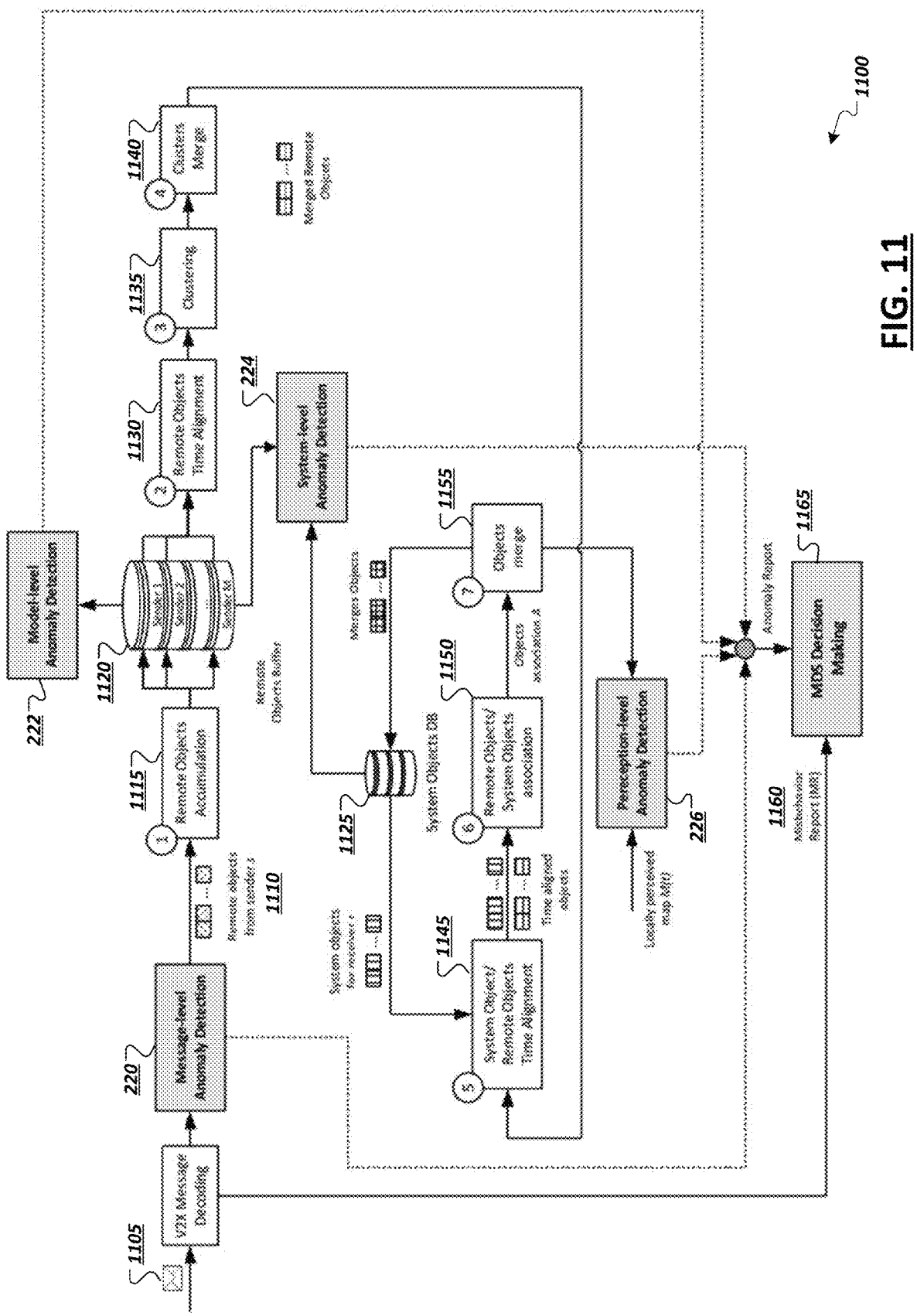
FIG. 11 is a simplified block diagram illustrating an example flow for detecting anomalies by a roadway system.

Turning to the flow diagram 1100 of FIG. 11, a multi-tier misbehavior detection approach is outlined. As introduced in FIG. 2, some implementations of a roadway system may include misbehavior detection engine capable of detecting anomalies or inconsistencies in V2X safety messages. Further, V2X messaging can itself be leveraged to enable collaborative misbehavior detection, prevention, and remediation. For instance, an example misbehavior detection system may include both local anomaly detection logic, which allows vehicles to autonomously detect anomalies (and thus misbehaviors) in the V2X data, and collaborative detection logic, where vehicles report locally detected anomalies within misbehavior reports (MRs) broadcasted to their neighbors. Received misbehavior reports may then bs used to make decisions locally on the potential misbehavior of a sending vehicle.

The example of FIG. 11 is a diagram 1100 illustrating the flow of an example misbehavior detection engine of a roadway system that includes multiple stages of misbehavior detection. For instance, a V2X message 1105 (e.g., safety message) may be received and be first processed by a message analysis engine 220 providing message-level anomaly detection. The message analysis engine 220 may parse the message 1105 to detect anomalies in the objects reported in the message 1105 on a per-message level, such as by performing simple range checks (e.g., acceleration outside predefined boundaries, sudden appearance/teleporting of an object, etc.) and identifying instances where the same object is redundantly identified, etc. The message 1105 may parsed to identify the individual objects 1110 identified by the sender of the message 1105. The objects identified in messages received from remote senders may be accumulated 1115 and held in a buffer (e.g., 1120), which continues to identify, on a sender-by-sender basis, the objects (and object attributes) reported by sending roadway systems (e.g., connected vehicles and RSUs) in an environment. In some implementations, track data (e.g., VT, LT, MT tracks) may be used to buffer and track objects identified by various senders.

Continuing with the example of FIG. 11, track data (e.g., in 1120) may be utilized by additional misbehavior detection stages, such as stages facilitated by a message prediction engine 222, and overlap detector 224. For instance, a message prediction engine 222 may provide model-level anomaly detection by detecting anomalies in the evolution of the information provided by any single sender over time. For instance, a model can identify the predicted state of an object after an amount of time has elapsed (e.g., corresponding to the time between messages) based on information contained in the immediately preceding messages sent by the sender and describing the object and determine anomalies based on the residual between the predicted state and the new information reported for the object in the message (e.g., 1105). An overlap detector 224 may look at anomalies at a higher level among objects and search for overlaps that may occur, which may indicate the presence of a misbehaving entity fabricating a ghost vehicle (which "overlaps" with another real vehicle). Such overlaps can be detected from the tracking information maintained and accumulated by receiving roadway system. In some implementations, a roadway system may have access to local sensors and sensor data that may be provided as inputs to a perception system that enables detection, recognition, and tracking of specific objects in a driving environment. The locally detected objects may be likewise stored and tracked (e.g., in data store 1125). An overlap detector 224 may, in such implementation, use information describing both remotely detected objects and locally perceived objects to perform system-level anomaly detection.

Remotely detected and reported objects may be further processed at the receiving roadway system to align the object reports on the basis of time (at 1130), cluster the object reports 1135 (e.g., to match information from messages originating from different senders that describe the same object), and create time-aligned object data for each reported object through cluster merging 1140. The clustered object information identified from V2X messages (e.g., 1105) may be time-aligned with corresponding information describing objects detected locally by the roadway system's perception logic (at 1145).

In some implementations, local perception logic of a roadway system may be effectively combined with those of other, neighboring roadway systems to implement a shared perception system where connected autonomous vehicles and even connected non-autonomous vehicles may share a list of N+1 perceived objects, where N objects are the objects perceived by the vehicle (e.g., if capable—in the case of non-autonomous, non-perceptive vehicles N=0), with 1 object describing the sender vehicle itself. For instance, a roadway system may maintain a list of objects S, which is updated with incoming V2X information. After a new message (e.g., 1105) is received from a sending vehicle, a receiving vehicle $v_r$ decodes 1108 the list of objects 1110 contained in it, and accumulates 1115 the reported objects for tracking (e.g., using a Kalman Filter). Messages may be received at a particular cadence, with the receiving roadway system fetching (e.g., at 1108) each of the latest objects (or data describing the detected objects in a driving environment) from all the neighboring senders, and aligns 1130 them to the latest timestamp (e.g., using a same or similar time reference, such as GPS time). In some cases, time alignment 1130 may be accomplished according to a model (e.g., a constant velocity model), which may be used to predict the state of objects in the environment, for which the longitudinal position of an object at time t+Δt is given by $x_{t+\Delta t} = x_t + \dot{x}_t \Delta t$. After alignment 1130, objects from multiple senders are clustered 1135 based on a distance metric (e.g., the Mahalanobis distance, which indicated the distance between objects if they are represented as Multivariate Gaussian variables). Clusters are then merged 1140 to produce a list of merged remote objects. Such list is then time-aligned 1145 with the current system objects (e.g., at 1125) detected using the receiving roadway system's sensors and perception logic, for instance, using an association algorithm (e.g., Global Nearest Neighbor), which maps 1150, if possible, remote objects (at 1120) to local objects (at 1125) (e.g., matching objects from the two sets that likely describe the same physical entity). Matching pairs of objects may be merged or fused 1155 together, while unmatched remote objects are added as new system objects for tracking. In some implementations, objects added to track data that remain un-updated for a long time may be removed according to some management policy, among other example features. In this manner, remotely identified objects may be associated with the locally perceived objects to develop object records (e.g., tracks) that incorporate both the remotely identified object information (from potentially multiple roadway systems) with the locally perceived object information. Such collective object information may be utilized by a perception analysis engine 226 to perform perception-level anomaly detection. For instance, the perception analysis engine 226 may detect inconsistencies between the space as perceived by the vehicle sensors, and those described in V2X messages (e.g., 1105). For example, a ghost vehicle may be present in an area that sensors detected as free, thus constituting an evident inconsistency.

At any one (and potential multiple) of the stages (corresponding to 220, 222, 224, 226), an anomaly may be detected and reported 1160 a misbehavior decision making engine 1165. In some cases, based on the severity of an anomaly or based on repeated anomalies involving a particular sender or object, the roadway system may generate misbehavior report message to send to other nearby roadway systems (e.g., other vehicles or RSUs) and/or a backend misbehavior authority system, among other examples. As shown in the example of FIG. 11, received V2X messages (e.g., 1105) may contain misbehavior reports of their own, which may also be considered and acted upon by misbehavior decision making engine 1160 to cause reports or remedial action to be initiated by the roadway system. Misbehavior reports may form the basis for collaborative misbehavior detection and remediation. A misbehavior decision making engine (e.g., 1160) uses local anomaly detection as primary input. If no alarms were triggered, there is still a possibility that an attacker is mounting an attack (e.g., a ghost vehicle attack where the ghost vehicle is outside the field of view of receiving roadway system' sensors). Accordingly, a misbehavior detection engine of the roadway system can also consider misbehavior reports sent by peers to detect and react misbehaviors. For instance, if the number of misbehavior reports sent for a potential malicious sender is greater than the redundancy of the object (e.g., the number of independent sources confirming the existence of that vehicle), the receiving roadway system may consider the input from the particular sending system to be malicious and discard all the object information originating from this sender (e.g., a purge associated information from track data maintained at the receiving system. In some cases, evidence of misbehavior may be received (e.g., in a received misbehavior report from a remote roadway system), but the evidence is insufficient to definitively determine that a particular sender should not be trusted, the receiving roadway system may continue to use the received V2X object information (e.g., to detect a forward collision and raise a warning). In some cases, a report of misbehavior involving a peer system may cause the receiving roadway system to watchlist this system (e.g., to determine if repeated misbehaviors are detected/reported) and may even treat information from "watchlisted" systems with more caution (e.g., at a reduced trust level) than information from a sender not on the receiving system's watchlist, among other examples.

In some implementations, an end-to-end misbehavior detection and management system may be implemented using roadway systems (on vehicles and RSUs) and one or more backend misbehavior authority systems. An end-to-end misbehavior management may include phases of (1) local inconsistency detection and reporting, and (2) reports processing and decision-making actuation. In the local inconsistency detection and reporting phase, a vehicle or a local infrastructure entity detects an inconsistency between the maintained object tracks and one or more received V2X messages. Such inconsistencies may be determined by roadway systems implemented on vehicles, RSUs, drone, among other examples.

In some implementations, the roadway system of a receiving vehicle may process an incoming BSM. The roadway system may maintain a untrusted systems list of detected misbehaving senders, against which it matches every incoming BSM before signature verification. If the sender ID is not in the untrusted systems list, the receiver checks whether the ID corresponds to one of the object tracks maintained by the roadway system. For instance, the receiving roadway system may check if the safety message references an object for which there is a known MT (e.g., a known V2X+LOS track). If this is the case, the receiving roadway system computes a statistical distance d=D(,) between the BSM data and the track, which gives a measure of the "divergence" of the V2X data with regard to the expected and measured value (e.g., based on perception of the same object by the roadway system (e.g., using the corresponding vehicle's sensors)). In some implementations, the receiving roadway system compares the calculated divergence, or value d with a predefined threshold T. For instance, if d >T, and this is the first time the BSM deviates from the MT, the receiver computes a time tolerance $\delta t$, corresponding to the amount of time (or number of subsequent messages) a given sender's BSMs may remain "anomalous" (e.g., outside the acceptable statistical distance from the ground truth determined using sensors and perception logic of the roadway system). If a set of BSMs from a sender are consistently anomalous over a defined number of messages or amount of time, the roadway system may determine that these anomalies constitute misbehavior on the part of the sender. Accordingly, the roadway system may cause a misbehavior report message to be sent to other roadway systems associated with other vehicles, RSUs, etc. Additionally, larger "deviations" of the BSM data from existing track values may lead to more immediate and/or severe consequences on the safety of other vehicles. In some implementations, the larger the deviation d, the smaller the $\delta t$ used to determine misbehavior, among other examples.

Figure 12:
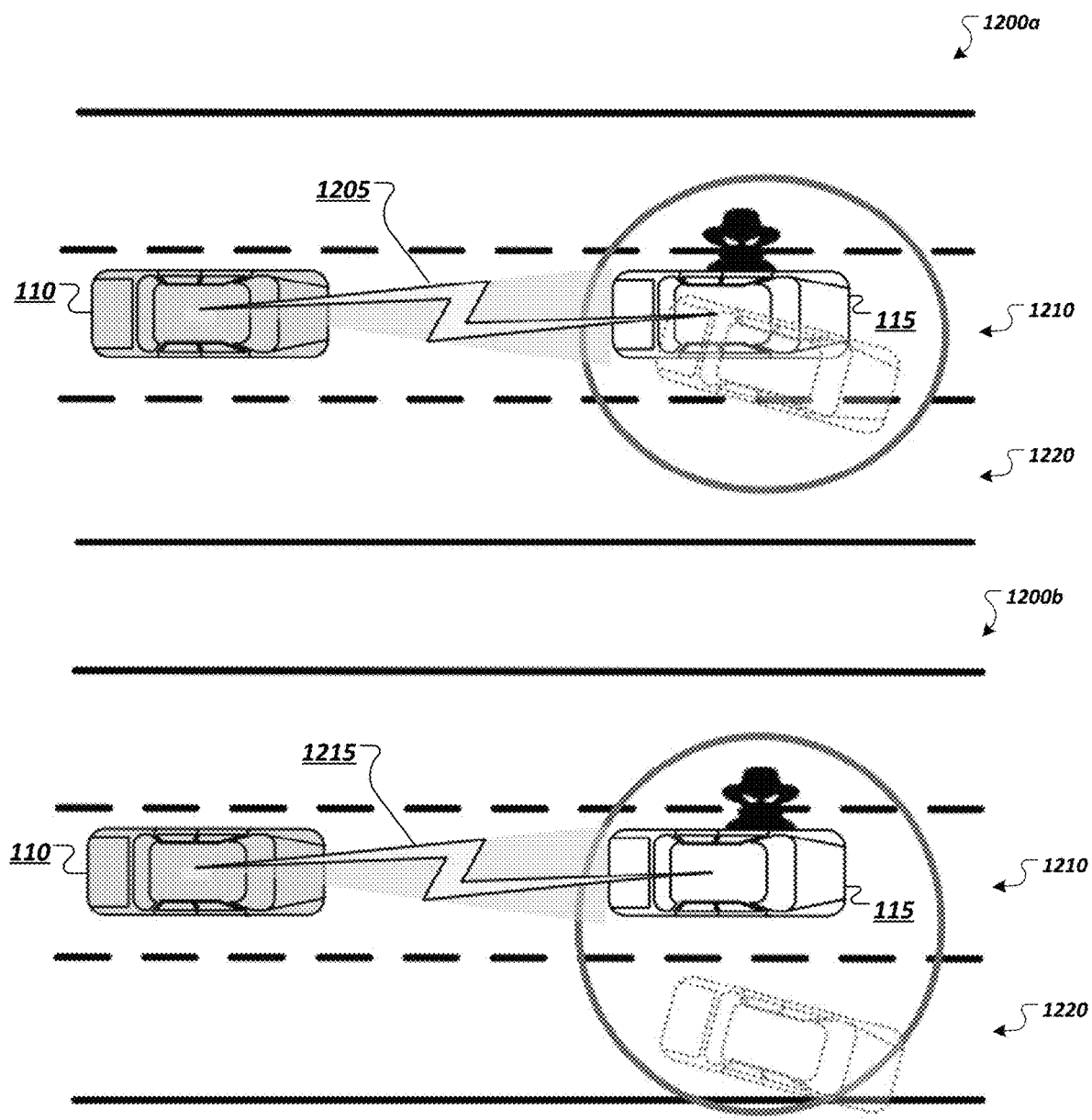
FIG. 12 illustrates diagrams showing different degrees of inconsistency, which may be measured by a roadway system when assessing communication-based misbehavior by another roadway system within an autonomous driving environment.

As an illustration, FIG. 12 illustrates two scenarios (in diagrams 1200a, 1200b) to show, by way of comparison, examples of a difference in the deviation of a message's description of an object versus what is observed by a particular vehicle (e.g., 110) using the vehicle's 110 perception system. In this example, the message may be received over a wireless communication channel (e.g., as a V2X BSM) from the roadway system of another vehicle (e.g., 115). The particular vehicle 110 may process the message (using its roadway system) to determine that one or more of the objects identified and described in the message does not fit what the vehicle 110 observes using its own sensors. For instance, the message may describe the vehicle 115 itself. In the example of diagram 1200a, a message 1205 from vehicle 115 may indicate that the vehicle 115 is moving slightly outside the lane 1210. However, the recipient vehicle 110 may perceive that the vehicle 115 is instead maintaining its course within the lane 1210. Accordingly, the roadway system of vehicle 110 may indicate an inconsistency or anomaly. In this example, the roadway system of vehicle 110 may regard the inconsistency as a relatively minor divergence from what is observed or expected and, rather than placing vehicle 115 on an untrusted systems list or sending a misbehavior message, place the vehicle's 115 roadway system on a watchlist (e.g., identifying the vehicle 115 by a corresponding certificate used in V2X communication). For instance, the recipient roadway system may track the time or number of messages which pass since a BSM received from vehicle 115 was first classified as anomalous and adds the sender to a watchlist.

Both the first time, and subsequent times where the calculated statistical divergence of the anomaly is d >T, if the elapsed time is greater than $\delta t$, the recipient roadway system may drop the BSM (and related data tracked in associated track data), issue an MBR message, and add the sender system's identifier to the untrusted systems list. In some examples, if a received message is detected as including an anomaly but with divergence of d<T, then the recipient roadway system may simply discard/ignore the message, while continuing to track the suspect system for subsequent anomalous MBRs. In this example, when an anomalous message is received for a particular object reported by a particular roadway system, the related track may be changed (where applicable) from mixed (MT) to line-of-sight only (LT) (as the most current tracking information is from the recipient roadway system's perception system only), among other examples. If a suspect roadway system has been added to a watchlist based on a previous anomalous message, but subsequent messages do not contain inconsistencies or anomalies (e.g., where the initial anomaly was an outlier (e.g., due to a temporary inaccuracy of its localization algorithm), the suspect roadway system may be removed from the watchlist, and its BSM data may be fused with related MT track data, among other examples.

Figure 13:
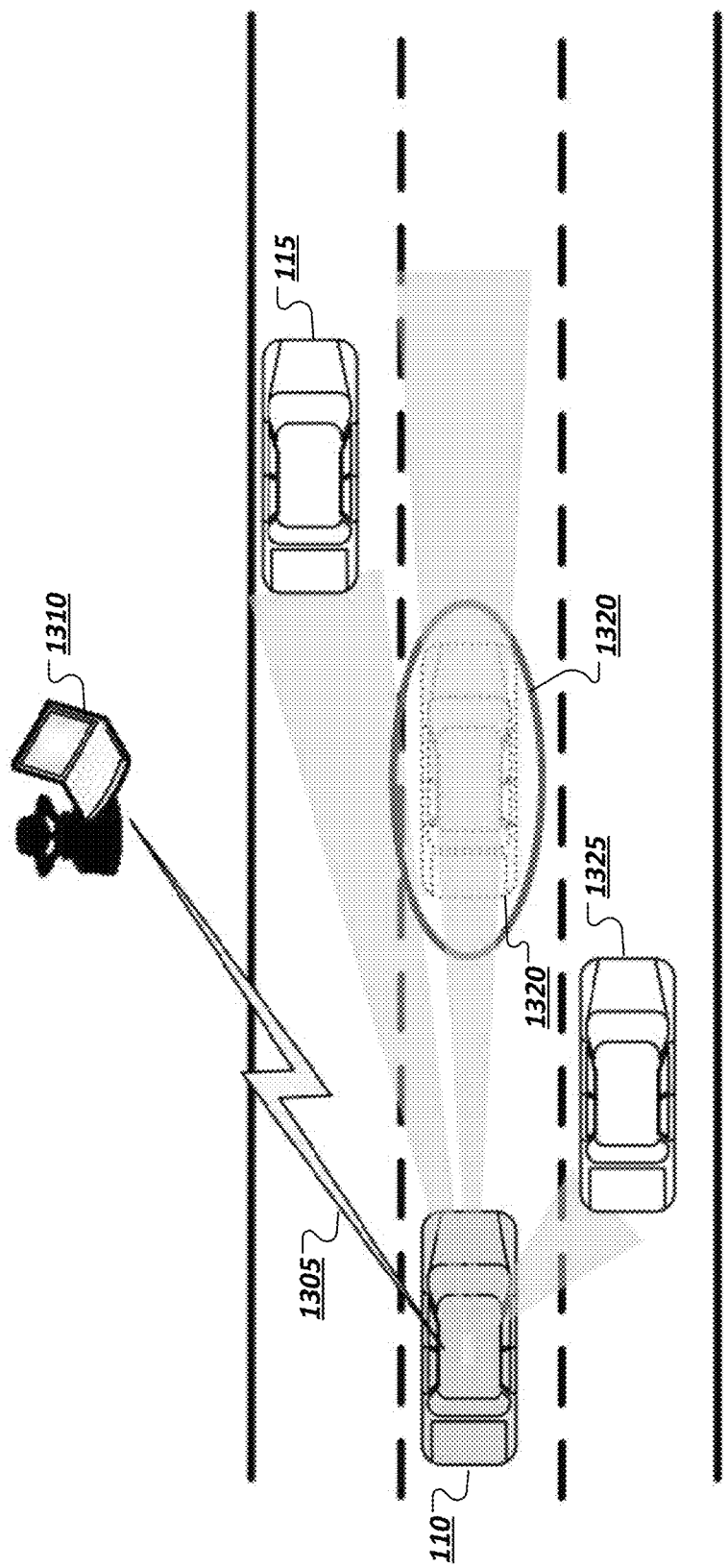
FIG. 13 is a simplified diagram illustrating an example of an attempted ghost vehicle attack.

Continuing with the example of FIG. 12, in the example of diagram 1200b, the message (e.g., 1215) received from vehicle 115 may indicate movement of the vehicle 115 from a different lane (e.g., 1220) indicating an uncharacteristic exist from the lane 1220. However, the perception system of the receiving roadway system (of vehicle 110) may again indicate that the subject object (vehicle 115) is actually proceeding forward within lane 1210. Based on a comparison of the recipient roadway system's perception of the vehicle 115 (and its position and movement) an inconsistency may be determined within the contents of message 1215. Additionally, a divergence value may be determined based on the degree of divergence between the information in the message 1215 and observed ground truth. In this example, rather than being a divergence d<T (e.g., as in the scenario illustrated in diagram 1200a), the recipient roadway system may determine a divergence d >T and, rather than watch-listing the sender 115, may immediately generate and send a misbehavior report, place the sender on a local untrusted systems list, among other remedial actions, based on the severity of the divergence, among other examples (such as the example of FIG. 13, where a message (e.g., 1305) to vehicle 110 from a malicious actor 1310 represents the presence of a ghost vehicle (e.g., 1315) within a free space 1320 (e.g., between vehicles 110, 115, 1325) detected by the vehicle's 110 roadway system, etc.).

Figure 14A:
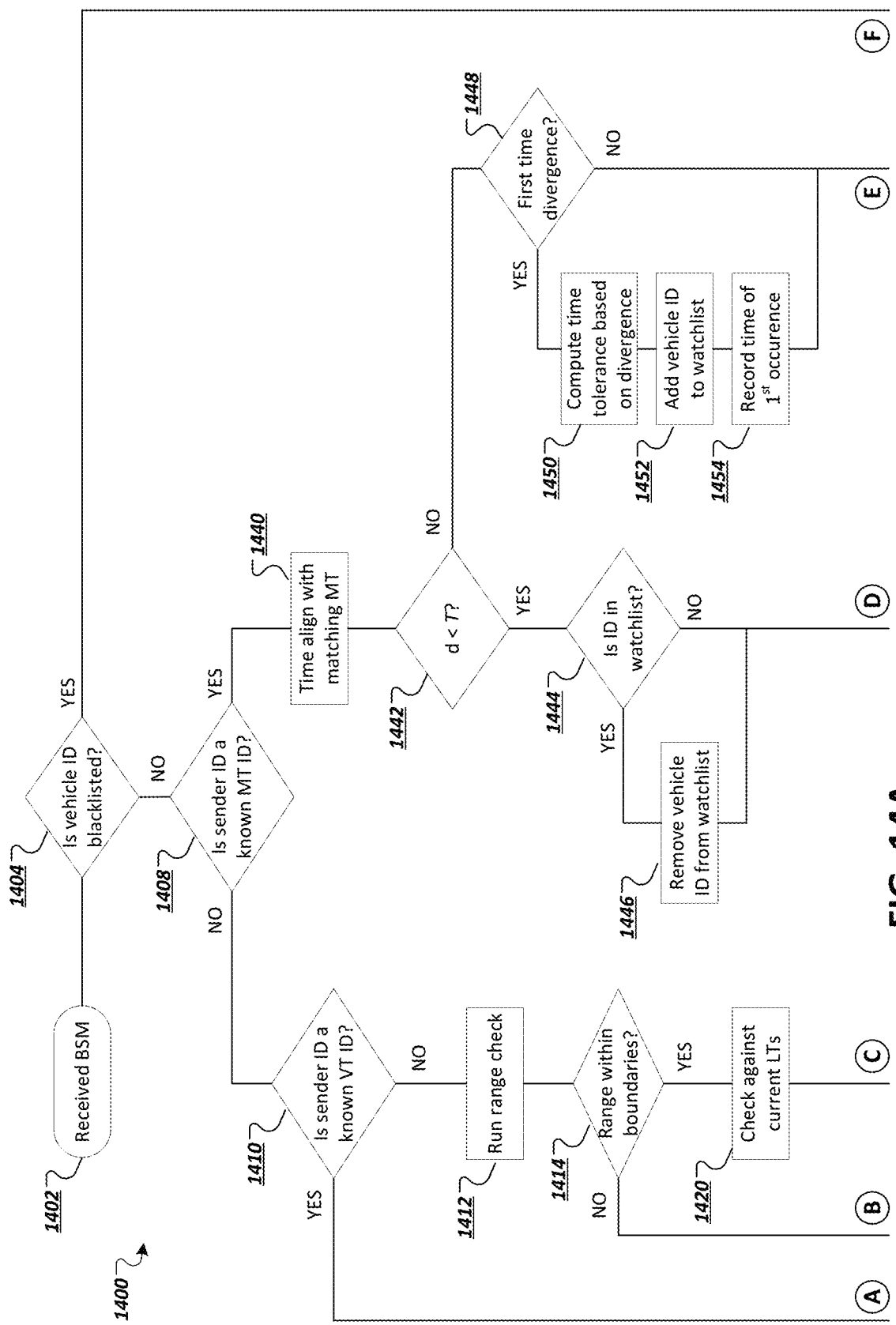
FIGS. 14A-14B illustrate a simplified block diagram illustrating example detection of communication-based misbehavior within an autonomous driving environment.
Figure 14B:
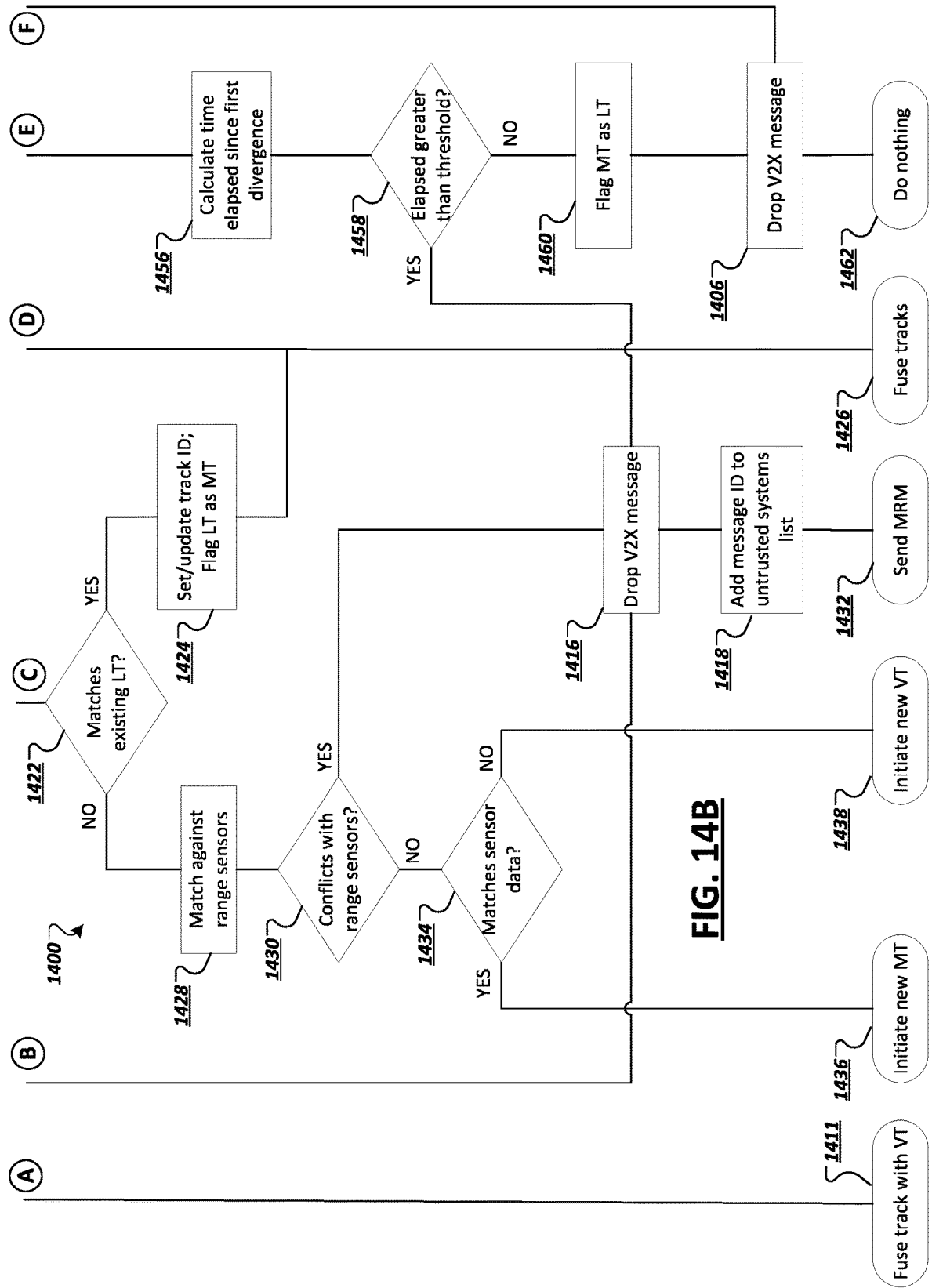

FIGS. 14A-14B show a flow diagram 1400 (continued from FIG. 14A to FIG. 14B) illustrating the example processing of an example basic safety message from a sending roadway system upon receipt 1402 of the message at a recipient roadway system. In one example, the recipient roadway system (or "recipient", for simplicity in describing this example) may determine 1404 if an identifier (e.g., certificate ID, vehicle ID, etc.) is present on a local copy of a untrusted systems list (e.g., a local untrusted systems list or global untrusted systems list). If the identifier of the sending roadway system (or simply "sender" within this example) is untrusted the recipient may simply drop 1406 the message without further processing. If, however, the sender is not untrusted, the recipient may further determine 1408 whether an identifier of the sender is included in mixed track data (e.g., has a corresponding MT ID). If not, the recipient may further determine 1410 whether the sender's ID corresponds to any V2X tracks (e.g., VT IDs). If the sender ID corresponds to a known VT, the information within the BSM may be fused 1411 with a corresponding VT. If the sender ID does not correspond to existing MTs (or VTs), the receiver may perform 1412 range checks (e.g., comparing the distance calculated with BSM's location with the maximum wireless range, or checking whether the BSM places the vehicle in a drivable space) to determine 1414 validity of the message (at the message level). For instance, if the message fails the range check(s), the message may be discarded 1416 (e.g., and the sender ID added 1418 to a local untrusted systems list).

If range checking 1414 is passed, the BSM data may be matched 1420 on the current set of LTs in the system tracks list, using some statistical distance measure (e.g., the Mahalanobis distance or other measure of statistical divergence between what has been perceived by the recipient). If the BSM matches (at 1422) an existing LT (e.g., a track for an object detected using receiver's line-of-sight (LOS) sensors), the track's ID is updated 1424 with sender's ID, and the BSM data is fused 1426 with the existing track (e.g., the LT data is labelled as MT). If the BSM does not match (at 1422) an existing LT, a consistency check is run to see of the information of the BSM matches 1428 perception results of the recipient based on the recipient's range sensor data to determine 1430 whether the content of the BSM conflicts with the recipient's range sensors or not (e.g., where a conflict may indicate a Ghost Vehicle (GV). If such an anomaly is detected at 1430 (e.g., BSM data places a vehicle on a free space such as in the example of FIG. 13), the message may be discarded 1416, sender ID is added 1418 to a local untrusted systems list, and a misbehavior report message 1432 may be generated and sent to other systems (e.g., neighboring vehicles, drones, RSUs, etc. or remote systems, such as a misbehavior authority system). On the other hand, if the information within the BSM matches (at 1434) (e.g., within a tolerance) the information determined by the recipient's sensors and perception system, a new MT record may be generated 1436 corresponding to the BSM and information of the BSM may be documented in the record. If not, a new VT may be similarly generated 1438 and populated with information from the BSM (e.g., based on the BSM belonging to a non-line-of-sight area for the receiver). In some implementations, VTs may be periodically matched against LTs, and possibly fused into MTs.

If a sender of a BSM is determined to be a known MT ID (and have a corresponding MT), the BSM may be time-aligned 1440 with the matching MT data and a divergence d may be determined for the information within the BSM (e.g., as compared with preceding information for the same object(s) described in the BSM) and compared 1442 against a threshold T. In this example, if d<T, it may be determined that the divergence may be ignored, causing the recipient to determine 1444 whether the ID of the sender is being tracked in a watchlist (e.g., based on a previously detected anomaly in a preceding message from the sender). If the sender is in a watchlist, it may be removed 1446 from the watchlist, prior to fusing 1426 the information within the BSM within the corresponding MT.

On the other hand, if d is not less than the threshold T (at 1442) the sender may be watched, which may include determining 1448 whether this is the first (e.g., within a time period) divergence in a message received from the sender at the recipient. If so, a time tolerance may be computed 1450 based on the divergence (e.g., with longer time tolerances being computed for less serious divergences), the ID of the sender may be added 1452 to a watchlist, and the time of the occurrence of the anomalous BSM may be recorded 1454 in the watchlist (e.g., with the time tolerance to determine the expiration of the time tolerance window). If the anomalous BSM is not the first occurrence, a time tolerance and time of initial anomalous message may already be determined, allowing a time since the first divergence to be calculated 1456 by the recipient. If the elapsed time is greater than the threshold set by the time tolerance (at 1458), then given that the received BSM continues to include inconsistencies or anomalies (e.g., even when the distance/divergence of the latest BSM is less than that of one of the preceding divergent BSMs from the sender), the latest BSM may be dropped 1416, leading to the sending of a misbehavior report message (e.g., 1432) and/or blacklisting (e.g., 1418) of the sender. If the calculated time threshold has not elapsed, the sender may remain on the watchlist (e.g., where a subsequent BSM from the sender may potentially result in the determination of a misbehavior) and the MT associated with the sender may be converted 1460 to an LT record (based on the flaws in this V2X BSM) and the BSM may be ignored (e.g., 1406) with no further remedial action 1462.

In some implementations of a misbehavior detection system of a roadway system, as result of the DATMO process, each roadway system maintains over time the following state for each tracked object (or track), at time t:

$$o_i(t) \sim \mathcal{N}(\mu_i(t)=[x(t),y(t),\dot{x}(t),\dot{y}(t),w(t),l(t)],P_i(t)),$$
$$i=1,2,\ldots,M,$$

where $\mathcal{N}$ indicates a (multivariate) normal distribution with mean μ and covariance matrix P; x, y is the position of the vehicle's center in 2D coordinates system $\dot{x}$, $\dot{y}$ represent the velocity of the vehicle along the two axes, and w, l are width and length of the vehicle. Additionally, each track may have an associated ID $id_i$ and may be labelled as a VT, MT or LT. Accordingly, in one example, a (signed) BSM message $m_i(t')$ sent at time t' by a vehicle i is defined as follows:

$$m_i(t')=\{id_i,t',z_i(t')=[x_i(t'),y_i(t'),\dot{x}_i(t'),\dot{y}_i(t'),w_i(t'),l_i(t')]\}.$$

A vehicle j that receives $m_i(t')$ at time t, once verifying that $id_i$ does not appear in j's untrusted systems list, may attempt to match $z_i(t')$ against each $o_k(t')$, k=1, 2, ..., M, by ID. In some instances, $id_i$ matches an existing MT. Let $o_k(t')$ be such a track. The track is first aligned in time with the BSM data (e.g., using a Constant Velocity model to predict the track's state forward in time). Then, the receiver estimates the distance of $z_i(t')$ from $o_k(t')$ based on, for example, the Mahalanobis distance. If the distance is lower than a predefined threshold T, $z_i(t')$ is fused with $o_k(t')$ (e.g., using a Kalman Filter (KF)). The Mahalanobis distance may distributes according to a $X^2$ distribution, and thus the threshold may be derived depending on the degrees of freedom, and the intended confidence interval. For instance, if the divergence/distance d is greater than T, and if this is the first time this happens, j determines the amount of time steps δt to wait before reporting the sender as misbehaving. δt is later used to determine, given n subsequent time periods of inconsistent V2X data, whether the inconsistency shall be reported to a misbehavior authority using a misbehavior report (e.g., if n>δt).

In other instances, $id_i$ does not match an existing MT. Accordingly, in this case, if $id_i$ matches an existing VT, the track is fused and the algorithm terminates, otherwise, $z_i(t')$ is checked to be within the radio range of j: if not, the message is dropped and the sender reported, otherwise j searches for a matching LT by calculating the distance of $z_i(t')$ from every LT. In case of a match, $z_i(t')$ may be fused with the matching LT, which is then flagged as MT, and its identifier is updated with $id_i$. Otherwise, $z_i(t')$ is matched against range sensors output (e.g., against a processed point-cloud or Occupancy Grid Map calculated by j). As an example, if the bounding box described by $z_i(t')$ overlaps significantly with an area determined free by the Occupancy Grid Mapping algorithm (e.g., if the report places the sender in a space that was detected as free by the receiver's range sensors) an anomaly flag may be raised and j may issue an MBR. If there is no conflict between range sensors and V2X data, a new VT may be initiated.

In some implementations, $id_i$ does not match an existing MT. Accordingly, in this case, if $id_i$ matches an existing VT, the track is fused and the algorithm terminates, otherwise, $z_i(t')$ is checked to be within the radio range of j: if not, the message is dropped and the sender reported, otherwise j searches for a matching LT by calculating the distance of $z_i(t')$ from every LT. In case of a match, $z_i(t')$ may be fused with the matching LT, which is then flagged as MT, and its identifier is updated with $id_i$. Otherwise, $z_i(t')$ is matched against range sensors output (e.g., against a processed point-cloud or Occupancy Grid Map calculated by j). As an example, if the bounding box described by $z_i(t')$ overlaps significantly with an area determined free by the Occupancy Grid Mapping algorithm (e.g., if the report places the sender in a space that was detected as free by the receiver's range sensors) an anomaly flag may be raised and j may issue an MBR. If there is no conflict between range sensors and V2X data, a new VT may be initiated.

Regarding the example above, in implementations, other representations may be utilized in the data exchanged by vehicles. For instance, a vehicle may send its location (x,y), heading (0), and forward speed (s). The difference between a "measurement" representation and the "state" representation may be handled by filters such as the KF, which operates using a transition matrix H (linear transformation) or function h (non-linear transformation) that converts state to measurement representation, among other examples. In some cases, nonlinearity may require the use of filters that can handle nonlinearity, such as the Extended KF (EKF) or Unscented KF (UKF), among other examples.

In some implementations, during a reports processing, decision making, and actuation phase, in response to detecting an act of misbehavior involving V2V or V2X messaging by a particular roadway system (e.g., on a vehicle, roadside unit, drone, etc.), another roadway system may send a corresponding misbehavior report message (MRM). In some implementations, such misbehavior report messages may be sent or forwarded to backend processing by a misbehavior authority, who may, in some cases, have discretion or authority to invalidate, downgrade, or otherwise change an offending system's communication credentials. In some implementations, different misbehavior report messages may be used for reporting immediately detected misbehavior to neighboring systems than used for reporting more detailed accounts of the misbehavior (and data used by the local roadway system in determining association misbehavior) to a backend misbehavior authority, given the different uses of the information in these contexts. For instance, local misbehavior report messages sent to neighboring vehicle and RSU roadway systems may be utilized to cause these vehicles to add a corresponding system ID to a watchlist or untrusted systems list for immediate use by the receiving roadway system. On the other hand, a misbehavior authority may compile misbehavior report messages over a period of time received in various time windows from various roadway systems and more carefully analyze the contents of misbehavior report messages relating to alleged misbehavior by a particular roadway system to determine whether to revoke an autonomous vehicle's communication credentials (e.g., SCMS certificate) should be revoked.

In one example, misbehavior report messages sent by vehicle and RSU roadway systems to a backend misbehavior authority system may include information to allow the misbehavior authority to judge the accuracy and background behind alleged, detected misbehavior. For instance, such misbehavior report messages may include reporter position (e.g., in GNSS coordinates), a copy of the message(s) (e.g., basic safety message) representing the act of misbehavior, data collected (e.g., by the reporting system's local sensors) as evidence of the inconsistency (e.g., in the form of an objects list, or Occupancy Grid Map, etc.), among other example information. A misbehavior report message may be signed with the reporting roadway system's credentials to ensure the authenticity of the misbehavior report message (e.g., and mitigate against malicious use of the misbehavior reporting regime), among other example features.

Figure 15:
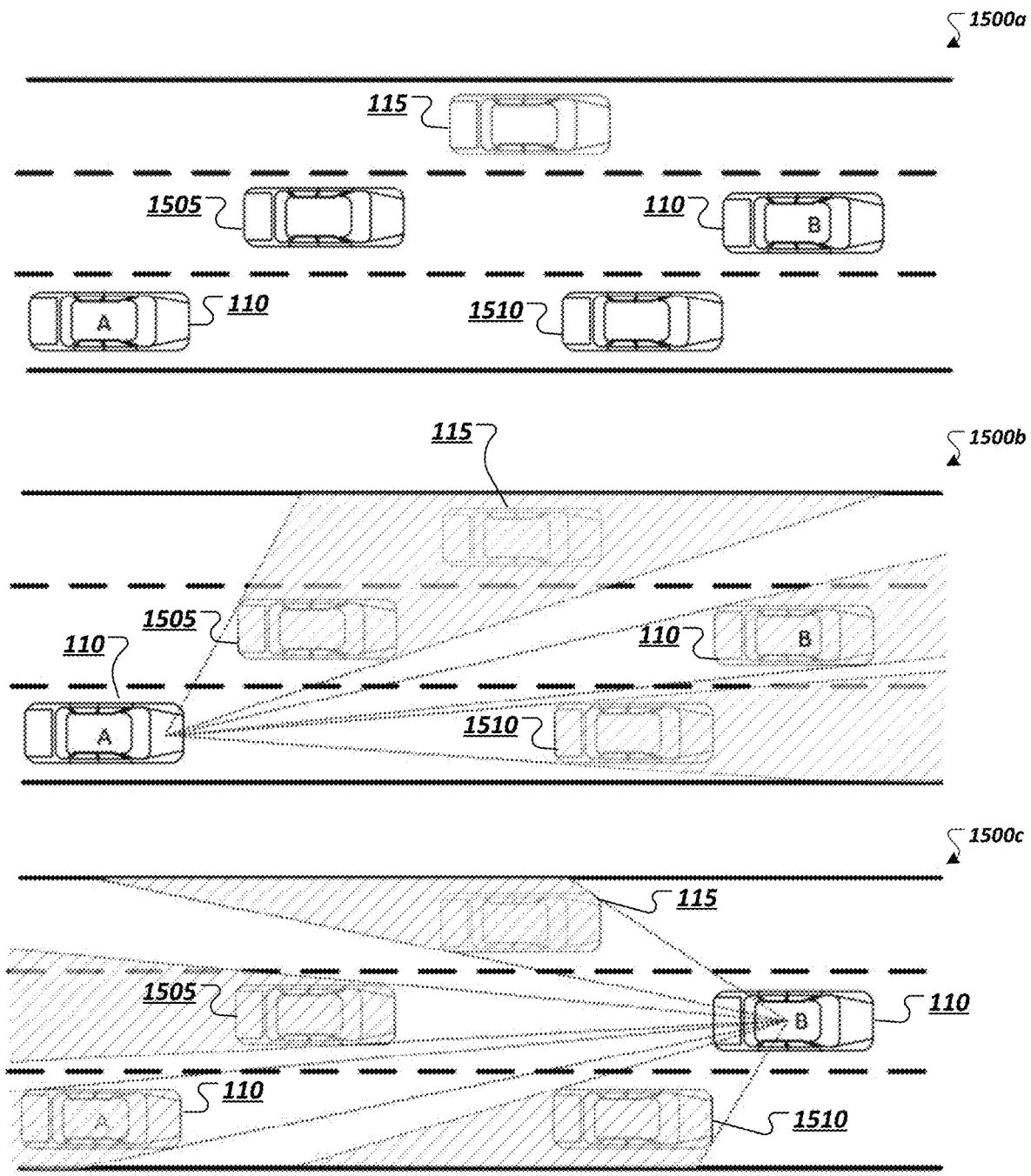
FIG. 15 illustrates diagrams showing differing fields of views of a reported object by different roadway systems within an autonomous driving environment.

In one example, when backend misbehavior authority system receives a set of misbehavior report messages, the misbehavior authority may determine whether and what remedial actions to initiate. In some implementations, a backend misbehavior authority system may weight different report messages differently when assessing the trustworthiness of the roadway system being complained of in the misbehavior report messages. For instance, the trust or quality of the reporting roadway system's point-of-view may be assessed, among other characteristics. In one implementation, upon receiving and identifying a related set of misbehavior report messages (e.g., identifying the same roadway system (e.g., by certificate ID)), the misbehavior authority system may compute a representation of the field of view of every one of the reporting vehicles with regard to the target vehicle (or the vehicle to examine for potential certificate revocation). For instance, FIG. 15 is a set of diagrams 1500a-c illustrating a driving environment at the time of two (or more) reported misbehaviors, measured and reported by respective roadway systems on vehicles 105 and 110 involving misbehavior by a particular roadway system on another vehicle 115. Diagram 1500a generally illustrates the driving environment, where vehicle 115 shares the road with other road actors, including vehicles 105, 110, 1505, 1510, etc.

As shown in the example of FIG. 15, some vehicles may have been in a better position both physically in terms of the sensors available on the vehicle to provide a field of view representation that better captures the behaviors of the target system (e.g., of vehicle 115). Diagram 1500b represents that field of view captured by vehicle 105, which may have sent a first misbehavior report to the misbehavior authority system, while diagram 1500c represents the field of view captured by another vehicle 110 also reporting misbehavior of vehicle 115, among other illustrative examples. Representations of the respective field of views of the reporting vehicles may be included or derived (e.g., by the misbehavior authority system) from the misbehavior report message(s) received from the reporting vehicles. The field of view (FOV) models may be used by the MA to estimate the number of potential witnesses and, from it, derive a minimum number of reports $nr_{min}$ to obtain in order to make a decision for the target roadway system 115. Further, using information in the misbehavior report messages, the misbehavior authority system may calculate a weight w that describes the reliability of the report, for instance, based on the estimated FOV model. As an example, weights may be computed according to the persistence probability $p_p$ in a multi-object tracking application. For instance, in the example of FIG. 15, different weights may be assigned to the respective reports from vehicles 105 and 110. In one example, given that vehicle 110 has a clearer view of the target vehicle 115, the misbehavior report message originating from vehicle 110 may be considered more reliable than the one from vehicle 105 and may be afforded a relatively higher weight. In some implementations, misbehavior authority system may compute the sum of all the weights determined for reports received for a particular target system. These values may be used to determine the weight that should be afforded to anyone of the misbehavior reports or the combined gravity of a collection of reports. In some implementations, a single misbehavior report may trigger remedial action by the misbehavior authority of the determined weight of the misbehavior report is above a threshold value. In some instances, revocation of the target system's certificate may be the remedy determined by the misbehavior authority system. Lesser actions may also be triggered, such as reducing a level of trust associated with the target system, placing the certificate of the target system in a watchlist for further assessment, among other example remedies. In one embodiment the revocation may be carried out using a Certificate Revocation List (CRL) including the target vehicle ID in it, among other example revocation techniques.

Figure 16:
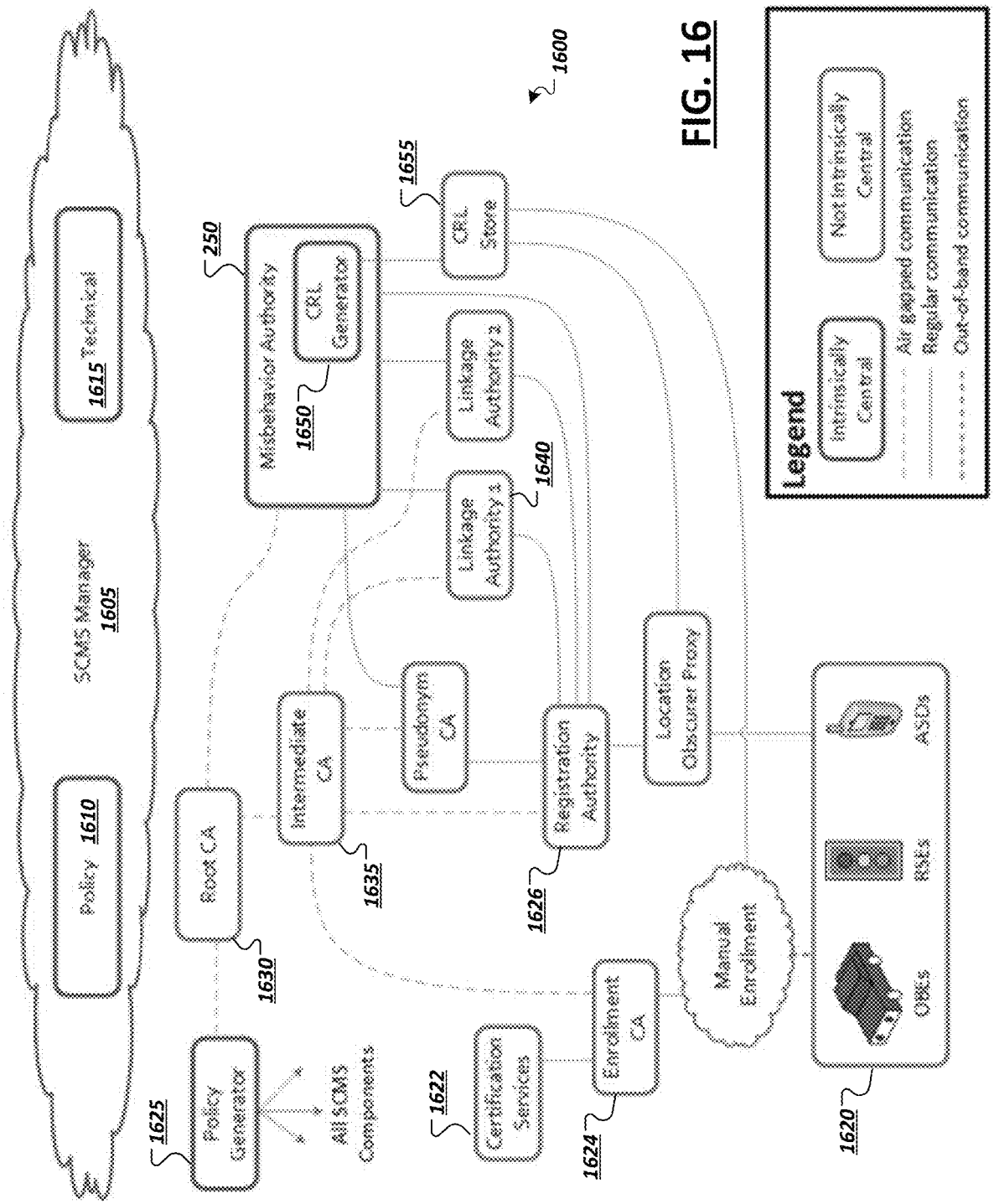
FIG. 16 is a simplified diagram illustrating an example certificate management architecture.

FIG. 16 is a simplified block diagram 1600 illustrating an example of a certificate management architecture, in which a misbehavior authority system (e.g., 250) may be a part. For instance, a variety of actors and systems may be involved in implementing the certificate management system 1605 (including policy 1610 and technical 1615 actors and subsystems). Some actors may be intrinsically central to the certificate management of various roadway systems (e.g., 1620, including those of vehicles (on-board equipment (OBEs) implementations), roadside units (e.g., roadside equipment (RSEs)), mobile devices (e.g., aftermarket safety devices (ASDs)), etc. A policy generator 1625 may push policies for use and management of communication certificates to all members of the architecture 1605, including certification services 1622, enrollment certificate authorities (CA) 1624, registration authorities 1626, etc. In some implementations, certificates may be hierarchical, with root certificates (managed by root CAs (e.g., 1630), intermediate certificates (managed by intermediate CAs (e.g., 1635), and so on. Linkage authorities (e.g., 1640) may be utilized together with registration authority entities (e.g., 1626) and misbehavior authority systems managing misbehavior reports (e.g., system 250). As noted above, a CRL may be utilized to establish and enforce revocations of certificates. For instance, an example misbehavior authority system 250 may include a CRL generator 1650 to generate and update CRL(s), which may be pushed to one or more CRL stores (e.g., 1655) for access by roadway systems in determining whether to trust and engage in communication with another roadway system within a driving environment, among other example components and implementations.

While much of the above discussion has focused on in-vehicle and roadside systems monitoring road safety events and apply vehicle safety standards to incidents involving at least partially autonomous road vehicles, it should be appreciated that the principles discussed herein may equally apply in other environments, where machines, designed to move autonomously, may be potentially targeted for exploitation using compromised safety messages. For instance, similar solutions and systems may be derived based on the principles above for machines including aerial vehicles, watercraft, unmanned drones, industrial robots, personal robots, among other examples.

Figure 17:
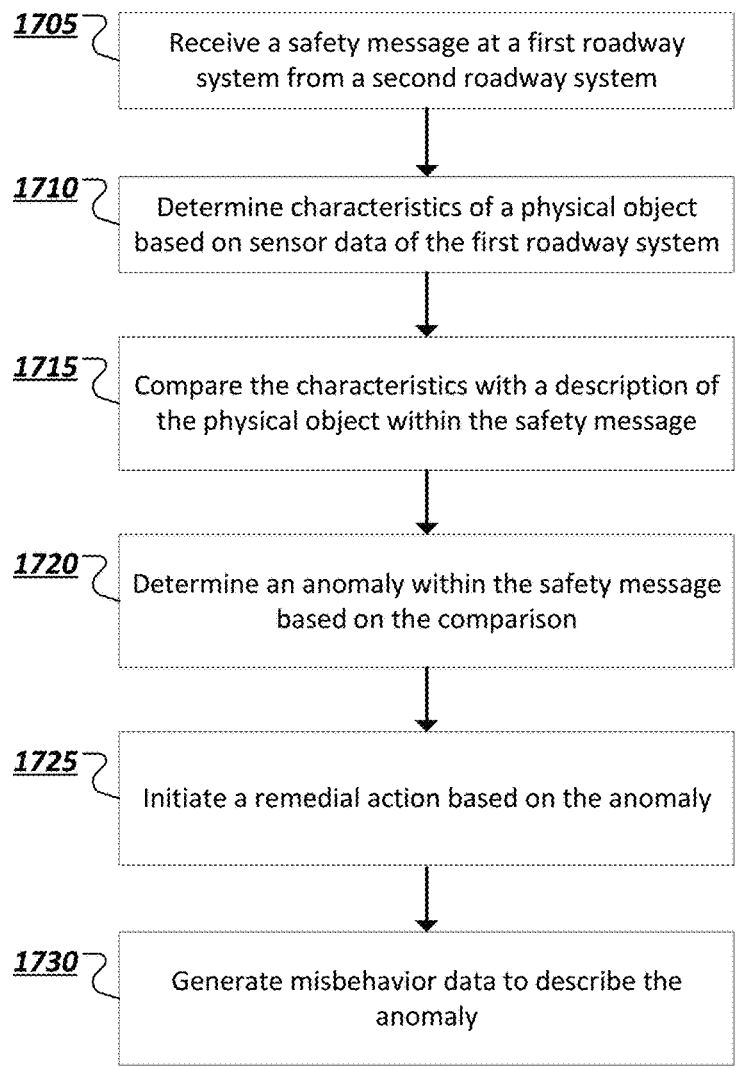
FIG. 17 is a simplified flow diagram illustrating an example technique for detecting communication-base misbehavior by a roadway system within an autonomous driving environment.

FIG. 17 is a simplified flow diagram 1700 illustrating an example technique for detecting communication-base misbehavior by a roadway system within an autonomous driving environment. For instance, a safety message may be received 1705 at a first roadway system (e.g., an autonomous vehicle system, drone, roadside unit, etc.) from another roadway system (e.g., of another autonomous vehicle, roadside unit, etc.). The safety message may describe one or more physical objects that are reported (by the second roadway system) as being present within the driving environment. The first roadway system may determine 1710 characteristics of the driving environment, including characteristics of the object (including whether the object is or is not present within the driving environment, its position within the environment, its size, whether and how the object is moving, etc.). The characteristics may be determined 1710 based on sensor data generated by sensors local to the first roadway system, as well as machine perception logic of the first roadway system. Additional characteristics may also be determined for the physical object based on other safety messages from other roadway systems also describing the object. The characteristics may be compared 1715 with the description of the object in the safety message from the second roadway system to determine 1720 an anomaly in the description of the safety message from the second roadway system. This anomaly may be based on a deviation from the description with characteristics observed by the first roadway system using its sensors and perception logic. The first roadway system may initiate one or more remedial actions based on the anomaly, such as watchlisting or placing the second roadway system on an untrusted systems list, notifying other roadway systems of the anomaly, reporting misbehavior by the second roadway system to a misbehavior authority system, etc. Indeed, misbehavior data may be generated (and in some cases sent by the first roadway system to other systems) describing the anomaly, including track data, misbehavior reports to other nearby roadway systems, misbehavior reports for consumption by a certificate authority, among other examples.

Figure 18:
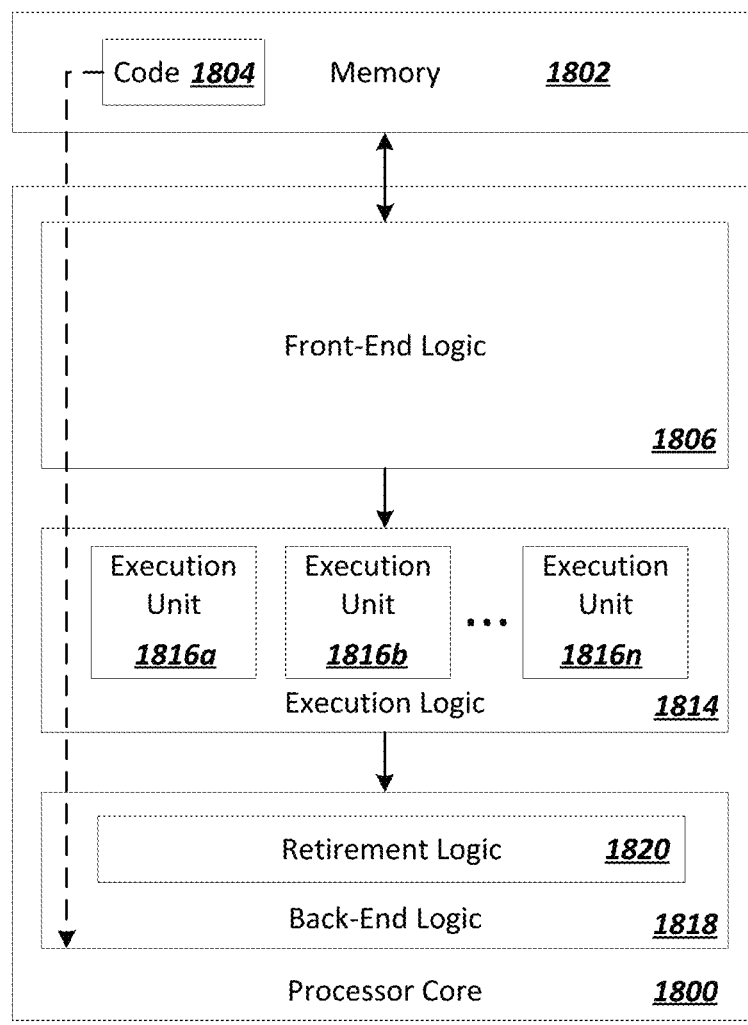
FIG. 18 is a block diagram of an exemplary processor in accordance with one embodiment.
Figure 19:
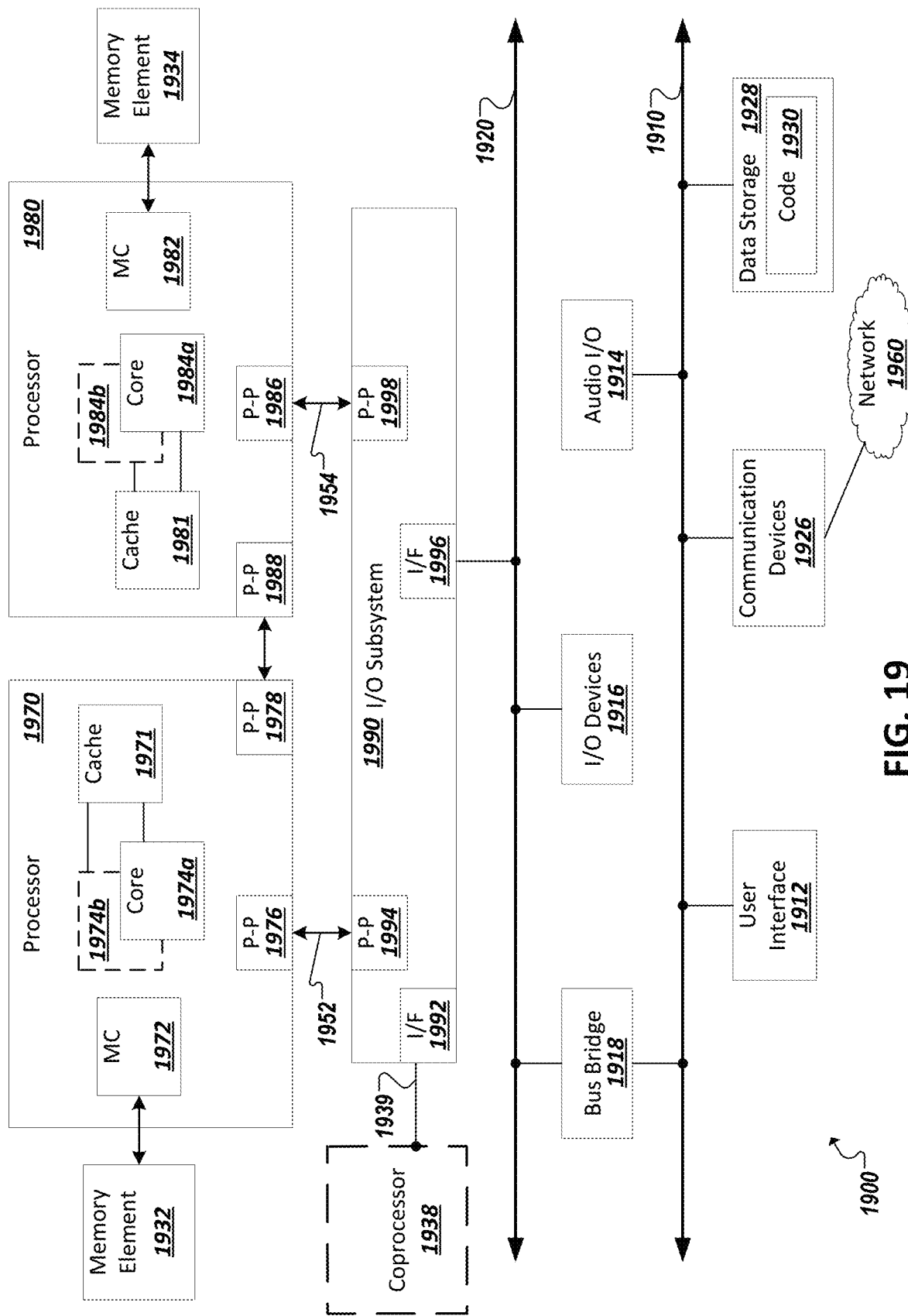
FIG. 19 is a block diagram of an exemplary computing system in accordance with one embodiment.

FIGS. 18-19 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 18-19.

FIG. 18 is an example illustration of a processor according to an embodiment. Processor 1800 is an example of a type of hardware device that can be used in connection with the implementations above. Processor 1800 may be any type of processor, such as a microprocessor, an embedded processor, a digital signal processor (DSP), a network processor, a multi-core processor, a single core processor, or other device to execute code. Although only one processor 1800 is illustrated in FIG. 18, a processing element may alternatively include more than one of processor 1800 illustrated in FIG. 18. Processor 1800 may be a single-threaded core or, for at least one embodiment, the processor 1800 may be multi-threaded in that it may include more than one hardware thread context (or "logical processor") per core.

FIG. 18 also illustrates a memory 1802 coupled to processor 1800 in accordance with an embodiment. Memory 1802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1800 can execute any type of instructions associated with algorithms, processes, or operations detailed herein. Generally, processor 1800 can transform an element or an article (e.g., data) from one state or thing to another state or thing.

Code 1804, which may be one or more instructions to be executed by processor 1800, may be stored in memory 1802, or may be stored in software, hardware, firmware, or any suitable combination thereof, or in any other internal or external component, device, element, or object where appropriate and based on particular needs. In one example, processor 1800 can follow a program sequence of instructions indicated by code 1804. Each instruction enters a front-end logic 1806 and is processed by one or more decoders 1808. The decoder may generate, as its output, a micro operation such as a fixed width micro operation in a predefined format, or may generate other instructions, microinstructions, or control signals that reflect the original code instruction. Front-end logic 1806 also includes register renaming logic 1810 and scheduling logic 1812, which generally allocate resources and queue the operation corresponding to the instruction for execution.

Processor 1800 can also include execution logic 1814 having a set of execution units 1816a, 1816b, 1816n, etc. Some embodiments may include a number of execution units dedicated to specific functions or sets of functions. Other embodiments may include only one execution unit or one execution unit that can perform a particular function. Execution logic 1814 performs the operations specified by code instructions.

After completion of execution of the operations specified by the code instructions, back-end logic 1818 can retire the instructions of code 1804. In one embodiment, processor 1800 allows out of order execution but requires in order retirement of instructions. Retirement logic 1820 may take a variety of known forms (e.g., re-order buffers or the like). In this manner, processor 1800 is transformed during execution of code 1804, at least in terms of the output generated by the decoder, hardware registers and tables utilized by register renaming logic 1810, and any registers (not shown) modified by execution logic 1814.

Although not shown in FIG. 18, a processing element may include other elements on a chip with processor 1800. For example, a processing element may include memory control logic along with processor 1800. The processing element may include I/O control logic and/or may include I/O control logic integrated with memory control logic. The processing element may also include one or more caches. In some embodiments, non-volatile memory (such as flash memory or fuses) may also be included on the chip with processor 1800.

FIG. 19 illustrates a computing system 1900 that is arranged in a point-to-point (PtP) configuration according to an embodiment. In particular, FIG. 19 shows a system where processors, memory, and input/output devices are interconnected by a number of point-to-point interfaces. Generally, one or more of the computing systems described herein may be configured in the same or similar manner as computing system 1800.

Processors 1970 and 1980 may also each include integrated memory controller logic (MC) 1972 and 1982 to communicate with memory elements 1932 and 1934. In alternative embodiments, memory controller logic 1972 and 1982 may be discrete logic separate from processors 1970 and 1980. Memory elements 1932 and/or 1934 may store various data to be used by processors 1970 and 1980 in achieving operations and functionality outlined herein.

Processors 1970 and 1980 may be any type of processor, such as those discussed in connection with other figures herein. Processors 1970 and 1980 may exchange data via a point-to-point (PtP) interface 1950 using point-to-point interface circuits 1978 and 1988, respectively. Processors 1970 and 1980 may each exchange data with a chipset 1990 via individual point-to-point interfaces 1952 and 1954 using point-to-point interface circuits 1976, 1986, 1994, and 1998. Chipset 1990 may also exchange data with a co-processor 1938, such as a high-performance graphics circuit, machine learning accelerator, or other co-processor 1938, via an interface 1939, which could be a PtP interface circuit. In alternative embodiments, any or all of the PtP links illustrated in FIG. 19 could be implemented as a multi-drop bus rather than a PtP link.

Chipset 1990 may be in communication with a bus 1920 via an interface circuit 1996. Bus 1920 may have one or more devices that communicate over it, such as a bus bridge 1918 and I/O devices 1916. Via a bus 1910, bus bridge 1918 may be in communication with other devices such as a user interface 1912 (such as a keyboard, mouse, touchscreen, or other input devices), communication devices 1926 (such as modems, network interface devices, or other types of communication devices that may communicate through a computer network 1960), audio I/O devices 1914, and/or a data storage device 1928. Data storage device 1928 may store code 1930, which may be executed by processors 1970 and/or 1980. In alternative embodiments, any portions of the bus architectures could be implemented with one or more PtP links.

The computer system depicted in FIG. 19 is a schematic illustration of an embodiment of a computing system that may be utilized to implement various embodiments discussed herein. It will be appreciated that various components of the system depicted in FIG. 19 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a machine-readable storage medium with instructions stored thereon, where the instructions are executable by a machine to cause the machine to: receive, at a first roadway system, a communication from a second roadway system over a wireless channel, where the communication includes an identification of the second roadway system and description of a physical objects within a driving environment; determine characteristics of the physical object based on sensors of the first roadway system; determine that the description of the physical object in the communication includes an anomaly based on a comparison with the characteristics of the physical object based on sensors of the first roadway system; generate misbehavior data to describe the anomaly; and determine whether to initiate a remedial action based on the anomaly.

Example 2 includes the subject matter of example 1, where the misbehavior data includes a misbehavior report message, and the instructions are further executable to cause the machine to send the misbehavior report message to another system to initiate at least a portion of the remedial action at the other system.

Example 3 includes the subject matter of example 2, where the identification of the second roadway system includes credentials of the second roadway system to engage in wireless communication with other roadway systems in the driving environment, the instructions are further executable to cause the machine to check the credentials of the second roadway system in association with receipt of the communication, and the other system includes a misbehavior authority system to determine whether the credentials of the second roadway system are to be revoked based on misbehavior associated with the anomaly.

Example 4 includes the subject matter of example 2, where the other system includes another roadway system in the driving environment, and the misbehavior data identifies to the other roadway system that the anomaly was detected in the communication from the second roadway system.

Example 5 includes the subject matter of example 2, where the instructions are further executable to cause the machine to receive another misbehavior report message from another roadway system, the other misbehavior report identifies an anomaly detected by the other roadway system involving a communication from the second roadway system at the other roadway system, and the remediate action is further determined based on the other misbehavior report.

Example 6 includes the subject matter of example 5, where the instructions are to further executable to determine whether a threshold of misbehavior reports has been met and the remedial action is based at least in part on whether the threshold is met.

Example 7 includes the subject matter of any one of examples 1-6, where the remedial action includes addition of the second roadway system to a watchlist, additional remedial action is to be initiated when anomalies are detected by the first roadway system in subsequent communications from the second roadway system based on inclusion of the second roadway system in the watchlist.

Example 8 includes the subject matter of any one of examples 1-7, where the remedial action includes adding the identifier of the second roadway system to a local untrusted systems list, the instructions are further executable to cause the machine to: scan communications received by the first roadway system to determine whether sender identifiers are included in the local untrusted systems list; and disregard communications from senders with sender identifier included in the local untrusted systems list.

Example 9 includes the subject matter of any one of examples 1-8, where the instructions are further executable to cause the machine to determine a degree of divergence in the description of the physical object in the communication from the characteristics of the physical object based on sensors of the first roadway system, where the initiation of the remedial action is based on the degree of divergence.

Example 10 includes the subject matter of example 9, where the instructions are further executable to determine an amount of anomalies in communications from the second roadway system during a time window, determining whether to initiate the remedial action is based on whether the amount of anomalies exceeds a threshold, and duration of the time window is based on the degree of divergence.

Example 11 includes the subject matter of any one of examples 1-10, where the communication includes a safety message, the first roadway system is to direct autonomous driving of a vehicle, and the first roadway system is to direct the autonomous driving based at least in part on safety messages received from other roadway systems in the driving environment.

Example 12 includes the subject matter of example 11, where the instructions are further executable to cause the machine to screen the safety message to determine whether a position of the physical object is within an assumed range. message screened for assumptions Example 13 includes the subject matter of any one of examples 11-12, where at least one other safety message is received from another roadway system and describes the physical object, and the anomaly is further based on a comparison of contents of the safety message with information in the other safety message.

Example 14 includes the subject matter of any one of examples 11-13, where the safety message is a second safety message received from the second roadway system after receipt of a first safety message from the second roadway system, the first safety message also describes the physical object, and the instructions are further executable to cause the machine to: determine, from a model, an expected state of the physical object based on the first safety message; and determine whether the description of the physical object in the second safety message diverges from the expected state, where the anomaly is further based on determination of a divergence between the description of the physical object and the expected state.

Example 15 includes the subject matter of any one of examples 1-14, where the instructions are further executable to generate track data to track the physical object.

Example 16 includes the subject matter of example 15, where respective track data is maintained for each one of a plurality of physical objects detected or reported within the driving environment.

Example 17 includes the subject matter of any one of examples 15-16, where the track data is labeled as a reported object track (VT), a perceived object track (LT), or a mixed track (MT) including both reported and perceived information.

Example 18 includes the subject matter of example 17, where the instructions are further executable to cause the machine to: identify existing track data for the physical object, where the existing track data includes a mixed track based at least in part on a previously received communication describing the physical object; and change designation of the existing track date from MT to LT based on the anomaly.

Example 19 includes the subject matter of any one of examples 15-17, where the track data is to merge information for physical objects obtained either or both internally by the first roadway system or from other roadway systems.

Example 20 includes the subject matter of any one of examples 1-19, where each of the first and second roadway systems include a respective one of an autonomous vehicle or a roadside unit.

Example 21 is a method including: receiving, at a first roadway system, a communication from a second roadway system over a wireless channel, where the communication includes an identification of the second roadway system and description of a physical objects within a driving environment; determining characteristics of the physical object based on sensors of the first roadway system; determining that the description of the physical object in the communication includes an anomaly based on a comparison with the characteristics of the physical object based on sensors of the first roadway system; generating misbehavior data to describe the anomaly; and determining whether to initiate a remedial action based on the anomaly, where the remedial action is to prevent the first roadway system from considering subsequent anomalous communications.

Example 22 includes the subject matter of example 21, further including sending the misbehavior data to another system as a misbehavior report message, where the misbehavior report message reports potential misbehavior by the second roadway system based on the anomaly.

Example 23 includes the subject matter of any one of examples 21-22, where the misbehavior data includes a misbehavior report message, and the method further includes sending the misbehavior report message to another system to initiate at least a portion of the remedial action at the other system.

Example 24 includes the subject matter of example 23, where the identification of the second roadway system includes credentials of the second roadway system to engage in wireless communication with other roadway systems in the driving environment, the method further includes checking the credentials of the second roadway system in association with receipt of the communication, and the other system includes a misbehavior authority system to determine whether the credentials of the second roadway system are to be revoked based on misbehavior associated with the anomaly.

Example 25 includes the subject matter of any one of examples 23-24, where the other system includes another roadway system in the driving environment, and the misbehavior data identifies to the other roadway system that the anomaly was detected in the communication from the second roadway system.

Example 26 includes the subject matter of any one of examples 23-25, further including receiving another misbehavior report message from another roadway system, the other misbehavior report identifies an anomaly detected by the other roadway system involving a communication from the second roadway system at the other roadway system, and the remediate action is further determined based on the other misbehavior report.

Example 27 includes the subject matter of example 26, further including determining whether a threshold of misbehavior reports has been met and the remedial action is based at least in part on whether the threshold is met.

Example 28 includes the subject matter of any one of examples 21-27, where the remedial action includes addition of the second roadway system to a watchlist, additional remedial action is to be initiated when anomalies are detected by the first roadway system in subsequent communications from the second roadway system based on inclusion of the second roadway system in the watchlist.

Example 29 includes the subject matter of any one of examples 21-28, where the remedial action includes adding the identifier of the second roadway system to a local untrusted systems list, and the method further includes: scanning communications received by the first roadway system to determine whether sender identifiers are included in the local untrusted systems list; and disregarding communications from senders with sender identifier included in the local untrusted systems list.

Example 30 includes the subject matter of any one of examples 21-29, further including determining a degree of divergence in the description of the physical object in the communication from the characteristics of the physical object based on sensors of the first roadway system, where the initiation of the remedial action is based on the degree of divergence.

Example 31 includes the subject matter of example 30, further including determining an amount of anomalies in communications from the second roadway system during a time window, determining whether to initiate the remedial action is based on whether the amount of anomalies exceeds a threshold, and duration of the time window is based on the degree of divergence.

Example 32 includes the subject matter of any one of examples 21-31, where the communication includes a safety message, the first roadway system is to direct autonomous driving of a vehicle, and the first roadway system is to direct the autonomous driving based at least in part on safety messages received from other roadway systems in the driving environment.

Example 33 includes the subject matter of example 32, further including screening the safety message to determine whether a position of the physical object is within an assumed range. message screened for assumptions Example 34 includes the subject matter of any one of examples 32-33, where at least one other safety message is received from another roadway system and describes the physical object, and the anomaly is further based on a comparison of contents of the safety message with information in the other safety message.

Example 35 includes the subject matter of any one of examples 32-34, where the safety message is a second safety message received from the second roadway system after receipt of a first safety message from the second roadway system, the first safety message also describes the physical object, and the method further includes: determining, from a model, an expected state of the physical object based on the first safety message; and determining whether the description of the physical object in the second safety message diverges from the expected state, where the anomaly is further based on determination of a divergence between the description of the physical object and the expected state.

Example 36 includes the subject matter of any one of examples 21-35, further including generating track data to track the physical object.

Example 37 includes the subject matter of example 36, where respective track data is maintained for each one of a plurality of physical objects detected or reported within the driving environment.

Example 38 includes the subject matter of any one of examples 36-37, where the track data is labeled as a reported object track (VT), a perceived object track (LT), or a mixed track (MT) including both reported and perceived information.

Example 39 includes the subject matter of example 38, further including: identify existing track data for the physical object, where the existing track data includes a mixed track based at least in part on a previously received communication describing the physical object; and change designation of the existing track date from MT to LT based on the anomaly.

Example 40 includes the subject matter of any one of examples 37-39, where the track data is to merge information for physical objects obtained either or both internally by the first roadway system or from other roadway systems.

Example 41 includes the subject matter of any one of examples 21-40, where each of the first and second roadway systems include a respective one of an autonomous vehicle or a roadside unit.

Example 42 is a system including means to perform the method of any one of examples 21-41.

Example 43 is a system including: one or more data processors; a memory; a set of sensors; a perception engine executable by at least one of the one or more data processors to use sensor data generated by the set of sensors to determine characteristics of physical objects within a driving environment; and a misbehavior detection engine executable by at least one of the one or more data processors to: identify a description of a particular physical object in a safety message received from a particular roadway system; compare characteristics of the particular physical object determined by the perception engine based on the sensor data to determine an anomaly in the description; determine whether the safety message includes misbehavior by the particular roadway system based at least in part on the anomaly; and initiate remedial action based on the anomaly.

Example 44 includes the subject matter of example 43, where the misbehavior detection engine is further to generate misbehavior data based on the anomaly.

Example 45 includes the subject matter of example 44, where the misbehavior data includes a misbehavior report message, and the misbehavior detection engine is to send the misbehavior report message to another system to initiate at least a portion of the remedial action at the other system.

Example 46 includes the subject matter of example 45, where the safety message includes credentials of the particular roadway system to engage in safety message communication with other roadway systems in the driving environment, the misbehavior detection engine is to check the credentials of the particular roadway system in association with receipt of the safety message, and the other system includes a misbehavior authority system to determine whether the credentials of the particular roadway system are to be revoked based on misbehavior associated with the anomaly.

Example 47 includes the subject matter of example 45, where the other system includes another roadway system in the driving environment, and the misbehavior data identifies to the other roadway system that the anomaly was detected in the communication from the particular roadway system.

Example 48 includes the subject matter of example 45, where the misbehavior detection engine is further to receive another misbehavior report message from another roadway system, the other misbehavior report identifies an anomaly detected by the other roadway system involving another safety message from the particular roadway system at the other roadway system, and the remedial action is further determined based on the other misbehavior report.

Example 49 includes the subject matter of example 48, where the instructions are to further executable to determine whether a threshold of misbehavior reports has been met and the remedial action is based at least in part on whether the threshold is met.

Example 50 includes the subject matter of any one of examples 43-49, where the remedial action includes addition of the particular roadway system to a watchlist, additional remedial action is to be initiated when anomalies are detected by the first roadway system in subsequent safety messages from the particular roadway system based on inclusion of the particular roadway system in the watchlist.

Example 51 includes the subject matter of any one of examples 43-50, where the remedial action includes adding the identifier of the particular roadway system to a local untrusted systems list, the misbehavior detection engine is further to: scan received safety messages to determine whether sender identifiers are included in the local untrusted systems list; and disregard communications from senders with sender identifier included in the local untrusted systems list.

Example 52 includes the subject matter of any one of examples 43-51, where the misbehavior detection engine is further to determine a degree of divergence in the description of the physical object in the communication from the characteristics of the physical object based on sensors of the first roadway system, where the initiation of the remedial action is based on the degree of divergence.

Example 53 includes the subject matter of example 52, where the instructions are further executable to determine an amount of anomalies in communications from the particular roadway system during a time window, determining whether to initiate the remedial action is based on whether the amount of anomalies exceeds a threshold, and duration of the time window is based on the degree of divergence.

Example 54 includes the subject matter of any one of examples 43-53, further including autonomous driving controls to direct autonomous driving of a vehicle, and the autonomous driving controls are to direct the autonomous driving based at least in part on safety messages received from other roadway systems in the driving environment.

Example 55 includes the subject matter of example 54, where the misbehavior detection engine is further to screen the safety message to determine whether a position of the physical object is within an assumed range. message screened for assumptions Example 56 includes the subject matter of any one of examples 54-55, where at least one other safety message is received from another roadway system and describes the physical object, and the anomaly is further based on a comparison of contents of the safety message with information in the other safety message.

Example 57 includes the subject matter of any one of examples 54-56, where the safety message is a second safety message received from the particular roadway system after receipt of a first safety message from the particular roadway system, the first safety message also describes the physical object, and the misbehavior detection engine is further to: determine, from a model, an expected state of the physical object based on the first safety message; and determine whether the description of the physical object in the second safety message diverges from the expected state, where the anomaly is further based on determination of a divergence between the description of the physical object and the expected state.

Example 58 includes the subject matter of any one of examples 43-57, where the instructions are further executable to generate track data to track the physical object.

Example 59 includes the subject matter of example 58, where respective track data is maintained for each one of a plurality of physical objects detected or reported within the driving environment.

Example 60 includes the subject matter of any one of examples 58-59, where the track data is labeled as a reported object track (VT), a perceived object track (LT), or a mixed track (MT) including both reported and perceived information.

Example 61 includes the subject matter of example 60, where the misbehavior detection engine is further to: identify existing track data for the physical object, where the existing track data includes a mixed track based at least in part on a previously received communication describing the physical object; and change designation of the existing track date from MT to LT based on the anomaly.

Example 62 includes the subject matter of any one of examples 59-61, where the track data is to merge information for physical objects obtained from either or both the perception engine or from other roadway systems.

Example 63 includes the subject matter of any one of examples 43-61, where the perception engine utilizes a machine learning model and provides the sensor data as inputs to the machine learning model to detect the physical objects, and the perception engine is further to track movement of the physical objects within the driving environment.

Example 64 includes the subject matter of any one of examples 43-63, where the system includes an at least partially autonomous vehicle to move within the driving environment and the vehicle includes a controller to control movement of the vehicle based at least in part on safety messages received from other systems within the driving environment.

Example 65 includes the subject matter of any one of examples 43-64, where the system includes roadside equipment to monitor the driving environment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one non-transitory machine-readable storage medium with instructions stored thereon, wherein the instructions are executable by a machine to cause the machine to:
  receive, at a first roadway system, a communication from a second roadway system over a wireless channel, wherein the communication comprises an identification of the second roadway system and description of a physical object within a driving environment;
  determine characteristics of the physical object based on sensors of the first roadway system;
  determine that the description of the physical object in the communication comprises an anomaly based on a comparison with the characteristics;
  generate misbehavior data to describe the anomaly; and
  determine whether to initiate a remedial action based on the anomaly.

2. The storage medium of claim 1, wherein the misbehavior data comprises a misbehavior report message, and the instructions are further executable to cause the machine to send the misbehavior report message to one or more other systems to initiate at least a portion of the remedial action at the other system.

3. The storage medium of claim 2, wherein the identification of the second roadway system comprises credentials of the second roadway system to engage in wireless communication with other roadway systems in the driving environment, the instructions are further executable to cause the machine to check the credentials of the second roadway system in association with receipt of the communication, and the one or more other systems comprise a misbehavior authority system to determine whether to revoke the credentials of the second roadway system based on misbehavior associated with the anomaly.

4. The storage medium of claim 2, wherein the one or more other systems comprise a set of roadway systems in the driving environment within range of the first roadway system, and the misbehavior data identifies to the set of roadway systems that the anomaly was detected in the communication from the second roadway system.

5. The storage medium of claim 2, wherein the instructions are further executable to cause the machine to receive another misbehavior report message from another roadway system, the other misbehavior report identifies an anomaly detected by the other roadway system involving a communication from the second roadway system at the other roadway system, and the remedial action is further determined based on the received other misbehavior report.

6. The storage medium of claim 1, wherein the remedial action comprises addition of the second roadway system to a watchlist, and subsequent communications from the second roadway system are to be monitored based on inclusion of the second roadway system in the watchlist to determine whether additional remedial action is to be initiated.

7. The storage medium of claim 1, wherein the remedial action comprises adding the identifier of the second roadway system to a local untrusted systems list, the instructions are further executable to cause the machine to:
  scan communications received by the first roadway system to determine whether sender identifiers are included in the local untrusted systems list; and
  disregard communications from senders with sender identifier included in the local untrusted systems list.

8. The storage medium of claim 1, wherein the instructions are further executable to cause the machine to determine a degree of divergence in the description of the physical object in the communication from the characteristics, wherein the initiation of the remedial action is based on the degree of divergence.

9. The storage medium of claim 8, wherein the instructions are further executable to determine an amount of anomalies in communications from the second roadway system during a time window, determining whether to initiate the remedial action is based on whether the amount of anomalies exceeds a threshold, and duration of the time window is based on the degree of divergence.

10. The storage medium of claim 1, wherein the communication comprises a safety message, the first roadway system is to direct autonomous driving of a vehicle, and the first roadway system is to direct the autonomous driving based at least in part on safety messages received from other roadway systems in the driving environment.

11. The storage medium of claim 10, wherein the instructions are further executable to cause the machine to screen the safety message to determine whether a position of the physical object is within an assumed range.

12. The storage medium of claim 10, wherein at least one other safety message is received from another roadway system and describes the physical object, and the anomaly is further based on a comparison of contents of the safety message with information in the other safety message.

13. The storage medium of claim 10, wherein the safety message is a second safety message received from the second roadway system after receipt of a first safety message from the second roadway system, the first safety message also describes the physical object, and the instructions are further executable to cause the machine to:
  determine, from a model, an expected state of the physical object based on the first safety message;
  determine whether the description of the physical object in the second safety message diverges from the expected state, wherein the anomaly is further based on determination of a divergence between the description of the physical object and the expected state.

14. The storage medium of claim 1, wherein each of the first and second roadway systems comprise a respective one of an autonomous vehicle or a roadside unit.

15. A method comprising:
  receiving, at a first roadway system, a communication from a second roadway system over a wireless channel, wherein the communication comprises an identification of the second roadway system and description of a physical object within a driving environment;
  determining characteristics of the physical object based on sensors of the first roadway system;
  determining that the description of the physical object in the communication comprises an anomaly based on a comparison with the characteristics;
  generating misbehavior data to describe the anomaly; and
  determining whether to initiate a remedial action based on the anomaly, wherein the remedial action is to prevent the first roadway system from considering subsequent anomalous communications from the second roadway system.

16. The method of claim 15, further comprising sending the misbehavior data to another system as a misbehavior report message, wherein the misbehavior report message reports potential misbehavior by the second roadway system based on the anomaly.

17. A system comprising:
  one or more data processors;
  a memory;
  a set of sensors;
  a perception engine executable by at least one of the one or more data processors to use sensor data generated by the set of sensors to determine characteristics of physical objects within a driving environment; and
  a misbehavior detection engine executable by at least one of the one or more data processors to:
    identify a description of a particular physical object in a safety message received from a particular roadway system;
    compare characteristics of the particular physical object determined by the perception engine based on the sensor data to determine an anomaly in the description;
    determine whether the safety message comprises misbehavior by the particular roadway system based at least in part on the anomaly; and
    initiate remedial action based on the anomaly.

18. The system of claim 17, wherein the perception engine utilizes a machine learning model and provides the sensor data as inputs to the machine learning model to detect the physical objects, and the perception engine is further to track movement of the physical objects within the driving environment.

19. The system of claim 17, wherein the system comprises an at least partially autonomous vehicle to move within the driving environment, and the vehicle comprises a controller to control movement of the vehicle based at least in part on safety messages received from other systems within the driving environment.

20. The system of claim 17, wherein the system comprises roadside equipment to monitor the driving environment.

* * * * *